US011727256B2

(12) United States Patent
Verheyen et al.

(10) Patent No.: US 11,727,256 B2
(45) Date of Patent: Aug. 15, 2023

(54) HARDWARE ARCHITECTURE FOR PROCESSING DATA IN NEURAL NETWORK

(71) Applicants: Henry Verheyen, Marina, CA (US); Jianjun Wen, San Jose, CA (US)

(72) Inventors: Henry Verheyen, Marina, CA (US); Jianjun Wen, San Jose, CA (US)

(73) Assignee: AIP SEMI, INC., Marina, CA (US)

( * ) Notice: Subject to any disclaimer, the term of this patent is extended or adjusted under 35 U.S.C. 154(b) by 160 days.

(21) Appl. No.: 17/459,782

(22) Filed: Aug. 27, 2021

(65) Prior Publication Data

US 2021/0390381 A1 Dec. 16, 2021

Related U.S. Application Data

(63) Continuation of application No. 17/196,922, filed on Mar. 9, 2021, now Pat. No. 11,106,972.

(60) Provisional application No. 62/987,813, filed on Mar. 10, 2020.

(51) Int. Cl.
*G06N 3/063* (2023.01)
*G06F 5/01* (2006.01)
*G06F 7/523* (2006.01)
*G06F 9/50* (2006.01)

(52) U.S. Cl.
CPC .............. *G06N 3/063* (2013.01); *G06F 5/01* (2013.01); *G06F 7/523* (2013.01); *G06F 9/5027* (2013.01)

(58) Field of Classification Search
CPC .......... G06N 3/063; G06N 3/045; G06F 5/01; G06F 7/523; G06F 7/5443; G06F 2207/4824

USPC ......................................................... 706/15
See application file for complete search history.

(56) References Cited

U.S. PATENT DOCUMENTS

| 5,455,891 | A | 10/1995 | Hirotsu et al. |
|---|---|---|---|
| 10,929,746 | B2 | 2/2021 | Litvak et al. |
| 2018/0005075 | A1 | 1/2018 | Shacham et al. |
| 2019/0065184 | A1 | 2/2019 | Zhi et al. |
| 2019/0095776 | A1 | 3/2019 | Kfir et al. |
| 2019/0205780 | A1 | 7/2019 | Sakaguchi et al. |

(Continued)

OTHER PUBLICATIONS

Alammar, J., "The Illustrated Transformer," Jun. 27, 2018, 23 pages, [Online] [Retrieved on Mar. 19, 2021] Retrieved from the Internet <URL: http://jalammar.github.io/illustrated-transformer/>.

(Continued)

*Primary Examiner* — Tan V Mai
(74) *Attorney, Agent, or Firm* — Fenwick & West LLP

(57) ABSTRACT

A hardware accelerator that is efficient at performing computations related to a neural network. In one embodiment, the hardware accelerator includes a first data buffer that receives input data of a layer in the neural network and shift the input data slice by slice downstream. The hardware accelerator includes a second data buffer that receives kernel data of the layer in the neural network and shift the kernel data slice by slice downstream. The hardware accelerator includes a first input shift register that receives an input data slice from the first data buffer. The first input shift register may correspond to a two-dimensional shift register configured to shift values in the input data slice in x and y directions. The hardware accelerator includes a second input shift register that receives a kernel data slice from the second data buffer. A multiplication block performs convolution of the input and kernel data.

20 Claims, 17 Drawing Sheets

(56) References Cited

U.S. PATENT DOCUMENTS

2020/0019851 A1 1/2020 Mehrabian et al.
2020/0242455 A1 7/2020 Meng et al.

OTHER PUBLICATIONS

Chazareix, A., "About Convolutional Layer and Convolution Kernel," Oct. 31, 2019, 13 pages, [Online] [Retrieved on Mar. 19, 2021] Retrieved from the Internet <URL: https://www.sicara.ai/blog/2019-10-31-convolutional-layer-convolution-ker-nel>.

Davis, C., "When is a large-sized kernel useful in CNN?," Apr. 13, 2017, six pages, [Online] [Retrieved on Mar. 19, 2021] Retrieved from the Internet <URL: https://www.quora.com/When-is-a-large-sized-kernel-useful-in-CNN>.

Jay, P., "Back-Propagation is very simple. Who made it Complicated?" Apr. 20, 2017, 28 pages, [Online] [Retrieved on Mar. 19, 2021] Retrieved from the Internet <URL: https://medium.com/@14prakash/back-propagation-is-very-simple-who-made-it--complicated-97b794c97e5c>.

Kang, N., "Multi-Layer Neural Networks with Sigmoid Function—Deep Learning for Rookies (2)," Jun. 27, 2017, 19 pages, [Online] [Retrieved on Mar. 19, 2021] Retrieved from the Internet <URL: https://towardsdatascience.com/multi-layer-neural-networks-with-sigmoid-f-unction-deep-learning-for-rookies-2-bf464f09eb7f>.

Lu, C.P., "Should We All Embrace Systolic Arrays?," Apr. 28, 2017, 11 pages, [Online] [Retrieved on Mar. 19, 2021] Retrieved from the Internet <URL: https://cplu.medium.com/should-we-all-embrace-systolic-array-df3-830f193dc>.

Mazur, M., "A Step by Step Backpropagation Example," Mar. 17, 2015, 21 pages, [Online] [Retrieved on Mar. 19, 2021] Retrieved from the Internet <URL: https://mattmazur.com/2015/03/17/a-step-by-step-backpropagation--example/>.

PCT International Search Report and Written Opinion, PCT Application No. PCT/US2021/021577, dated Jun. 28, 2021, ten pages.

Seth, Y., "Bert Explained—A list of Frequently Asked Questions," Jun. 12, 2019, 14 pages, [Online] [Retrieved on Mar. 19, 2021] Retrieved from the Internet <URL: https://yashuseth.blog/2019/06/12/bert-explained-faqs-understand-bert-wor-king/>.

Figure 7

12 x 12 kernel

16 3x3 Sections 801

(table of 16 3x3 blocks, each containing:)
| 1 | 2 | 3 |
|---|---|---|
| 4 | 5 | 6 |
| 7 | 8 | 9 |

Term3a_11 = A1+B2+C3+....H8+I9
Term3a_21 = A1+B2+C3+....H8+I9
Term3a_22 = A1+B2+C3+....H8+I9
Term3a_12 = A1+B2+C3+....H8+I9

16 terms * 9 positions = 144

4 6x6 Sections 802

(table of 4 6x6 blocks, each containing values 1–36 in row-major order)

| 1 | 2 | 3 | 4 | 5 | 6 |
|---|---|---|---|---|---|
| 7 | 8 | 9 | 10 | 11 | 12 |
| 13 | 14 | 15 | 16 | 17 | 18 |
| 19 | 20 | 21 | 22 | 23 | 24 |
| 25 | 26 | 27 | 28 | 29 | 30 |
| 31 | 32 | 33 | 34 | 35 | 36 |

Term6_11 = Term3a_11 + Term3b_11 + Term3c_11 + Term3d_11
Term6_12 = Term3a_12 + Term3b_12 + Term3c_12 + Term3d_12
Term6_21 = Term3a_21 + Term3b_21 + Term3c_21 + Term3d_21
Term6_22 = Term3a_22 + Term3b_22 + Term3c_22 + Term3d_22

(16/4) * (4*9) = 4 terms * 36 positions = 144

1 12x12 Sections 803

(single 12x12 block with repeating 1–9 pattern)

Term12 = Term6_11 + Term6_12 + Term6_21 + Term6_22

(4/1) * (36*4) = 1 term * 144 positions = 144

*Provisional #48*

Figure 8

Matrix Multiplication

Example for 3x3 matrix

- Very basic, we start with:
  $C_{ij} = ai_1 * b_{1j} + ai_2 * b_{2j} + ai_3 * b_{3j}$
  $= \sum_{k=1}^{n} a_{ik} * b_{kj}$ (3 terms)

- We can pictorialize this as:

- Which we further simplify as:

- Which we can describe as:
  c11 = a1 * b1
  c12 = a1 * b2
  c13 = a1 * b3
  c21 = a2 * b1 and so on, in which we represent ai and bj as vectors, and their products, cij as scalars

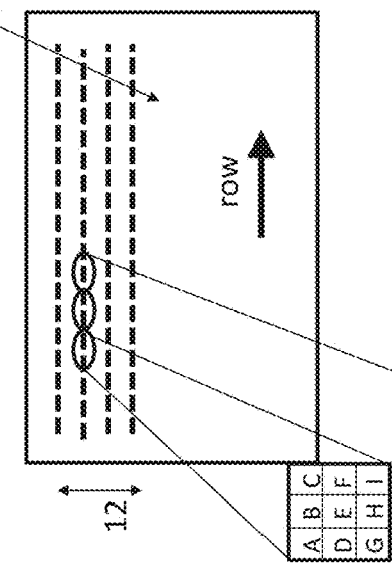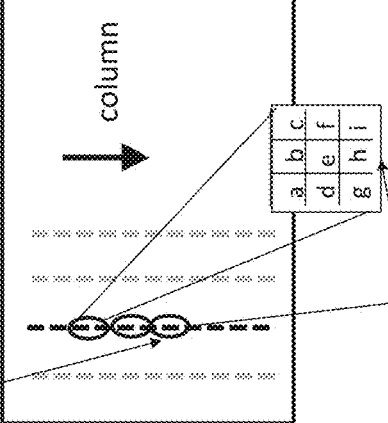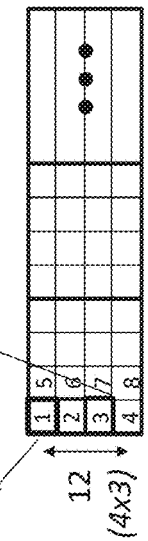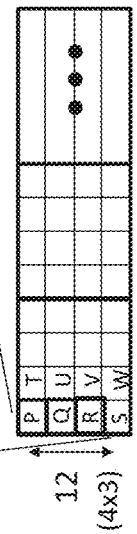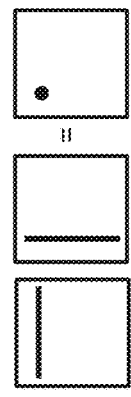
Figure 17

HARDWARE ARCHITECTURE FOR PROCESSING DATA IN NEURAL NETWORK

CROSS-REFERENCE TO RELATED APPLICATION

The present application is a continuation of U.S. application Ser. No. 17/196,922 filed on Mar. 9, 2021, which claims the benefit of and priority to U.S. Provisional Patent Application 62/987,813, filed on Mar. 10, 2020, which is hereby incorporated by reference in its entirety.

FIELD OF THE DISCLOSURE

The present disclosure relates to learning and processing neural network, and more specifically to hardware architecture that is efficient at performing operations related to convolutions and matrix multiplications.

BACKGROUND

The use of artificial neural networks (ANN), or simply neural networks, includes a vast array of technologies. An ANN's complexity, in terms of the number of parameters, is growing exponentially at a faster rate than hardware performance. In many cases, an ANN may have a large number of parameters. Training and inference on these networks are bottlenecked by massive linear tensor operations, multiplication and convolution. Consequently, a large amount of time and/or resource may be used for both ANN creation (e.g., training) and execution (e.g., inference).

Computing systems that execute ANNs often involve extensive computing operations including multiplication and accumulation. For example, CNN is a class of machine learning techniques that primarily uses convolution between input data and kernel data, which could involve a large number of multiplication and accumulation operations. Using a central processing unit (CPU) and its main memory to instantiate and execute machine learning systems or models of various configurations is relatively easy because such systems or models can be instantiated with mere updates to code. However, relying solely on the CPU for various operations of these machine learning systems or models would consume significant bandwidth of a central processing unit (CPU) as well as increase the overall power consumption.

In ANN, performance is achieved by enabling a grid of many processing elements (PE) to operate in parallel, examples are GPU and mesh-CPU. Data handling (fetch, compute, store) in such architectures can have a negative impact on performance.

SUMMARY

Embodiments relate to an artificial intelligence accelerator for performing convolutional operations related to a neural network. The artificial intelligence accelerator may include a first data buffer configured to receive input data of a layer in the neural network and shift the input data slice by slice downstream. Each slice has a predetermined size and dimension. The artificial intelligence accelerator may also include a second data buffer configured to receive kernel data of the layer in the neural network and shift the kernel data slice by slice downstream. The artificial intelligence accelerator may further include a first input shift register coupled to the first data buffer. The first input shift register may have the size and dimension of the slice and may be configured to receive an input data slice from the first data buffer. The first input shift register may include a two-dimensional shift register configured to shift values in the input data slice in a first direction and in a second direction. The artificial intelligence accelerator may further include a second input shift register coupled to the second data buffer. The second input shift register may have the size and dimension of the slice and configured to receive a kernel data slice from the second data buffer. The artificial intelligence accelerator may further include a multiplication block circuit coupled to the first input shift register and the second input shift register. The multiplication block circuit is configured to perform computations related to the convolutional operations between values in the input data slice and values in the kernel data slice. The artificial intelligence accelerator may further include an output buffer coupled to the multiplication block circuit. The output buffer is configured to receive an output of the computations of the multiplication block circuit and pass the output back to the first data buffer as input data of a succeeding layer in the neural network.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIG. 7 is an illustration to explain how an AI processor architecture is used to resolve CNN geometrically, according to an embodiment.

FIG. 8 shows an embodiment of geometric arrangement for a 3×3 kernel—a 12×12 grid is formed out of four 6×6 grid, each having four 3×3 grids, according to an embodiment.

FIG. 17 shows the same matrix multiplication mapped to the Data Buffers, Rows map to Data Buffer A and Columns map to Data Buffer B, according to an embodiment.

DETAILED DESCRIPTION OF EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Computing Device Architecture

Figure 1:
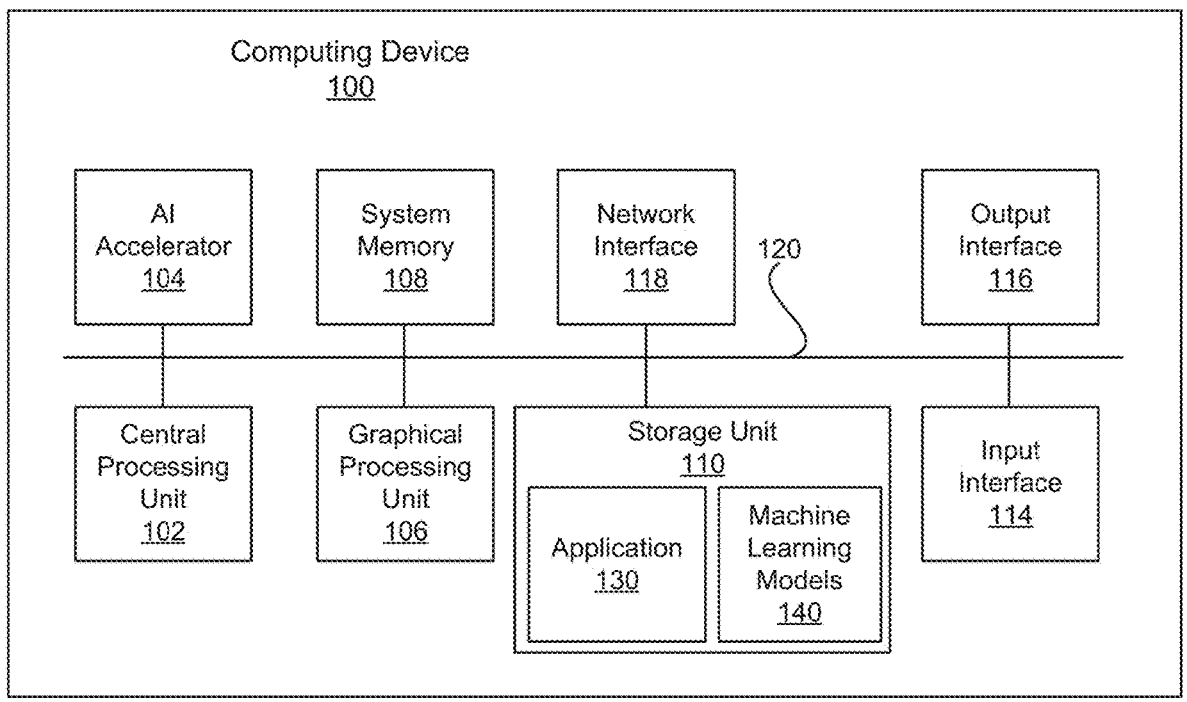
FIG. 1 is a block diagram of a computing device, according to some embodiments.

FIG. 1 is a block diagram of an example computing device 100 for processing one or more neural networks, according to an embodiment. A computing device 100 may be a server computer, a personal computer, a portable electronic device, a wearable electronic device (e.g., a smartwatch), an IoT device (e.g., a sensor), smart/connected appliance (e.g., a refrigerator), dongle, a device in edge computing, a device with limited processing power, etc. The computing device 100 may include, among other components, a central processing unit (CPU) 102, an artificial intelligence accelerator (AI accelerator) 104, a graphical processing unit (GPU) 106, system memory 108, a storage unit 110, an input interface 114, an output interface 116, a network interface 118, and a bus 120 connecting these components. In various embodiments, computing device 100 may include additional, fewer or different components.

While some of the components in this disclosure may at times be described in a singular form while other components may be described in a plural form, various components described in any system may include one or more copies of the components. For example, a computing device 100 may include more than one processor such as CPU 102, AI accelerator 104, and GPU 106, but the disclosure may refer the processors to as "a processor" or "the processor." Also, a processor may include multiple cores.

CPU 102 may be a general-purpose processor using any appropriate architecture. CPU 102 retrieves and executes computer code that includes instructions, when executed, that may cause CPU 102 or another processor, individually or in combination, to perform certain actions or processes that are described in this disclosure. Instructions can be any directions, commands, or orders that may be stored in different forms, such as equipment-readable instructions, programming instructions including source code, and other communication signals and orders. Instructions may be used in a general sense and are not limited to machine-readable codes. CPU 102 may be used to compile the instructions and also determine which processors may be used to performed certain tasks based on the commands in the instructions. For example, certain machine learning computations may be more efficient to be processed using AI accelerator 104 while other parallel computations may be better to be processed using GPU 106.

AI accelerator 104 may be a processor that is efficient at performing certain machine learning operations such as tensor multiplications, convolutions, tensor dot products, etc. In various embodiments, AI accelerator 104 may have different hardware architectures. For example, in one embodiment, AI accelerator 104 may take the form of field-programmable gate arrays (FPGAs). In another embodiment, AI accelerator 104 may take the form of application-specific integrated circuits (ASICs), which may include circuits along or circuits in combination with firmware.

GPU 106 may be a processor that includes highly parallel structures that are more efficient than CPU 102 at processing large blocks of data in parallel. GPU 106 may be used to process graphical data and accelerate certain graphical operations. In some cases, owing to its parallel nature, GPU 106 may also be used to process a large number of machine-learning operations in parallel. GPU 106 is often efficient at performing the same type of workload many times in rapid succession.

In FIG. 1, While the processors CPU 102, AI accelerator 104, and GPU 106 are illustrated as separated components, in various embodiments the structure of one processor may be embedded in another processor. For example, one or more examples of the circuitry of AI accelerator 104 disclosed in different figures of this disclosure may be embedded in a CPU 102. The processors may also all include in a single chip such as in a system-on-a-chip (SoC) implementation. In various embodiments, computing device 100 may also include additional processors for various specific purposes. In this disclosure, the various processors may be collectively referred to as "processors" or "a processor."

System memory 108 includes circuitry for storing instructions for execution by a processor and for storing data processed by the processor. System memory 180 may take the form of any type of memory structure including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. System memory 108 usually takes the form of volatile memory.

Storage unit 110 may be a persistent storage for storing data and software applications in a non-volatile manner. Storage unit 110 may take the form of read-only memory (ROM), hard drive, flash memory, or another type of non-volatile memory device. Storage unit 110 stores the operating system of the computing device 100, various software applications 130 and machine learning models 140. Storage unit 110 may store computer code that includes instructions that, when executed, cause a processor to perform one or more processes described in this disclosure.

Applications 130 may be any suitable software applications that operate at the computing device 100. An application 130 may be in communication with other devices via network interface 118. Applications 130 may be of different types. In one case, an application 130 may be a web application, such as an application that runs on JavaScript. In another case, an application 130 may be a mobile application. For example, the mobile application may run on Swift for iOS and other APPLE operating systems or on Java or another suitable language for ANDROID systems. In yet another case, an application 130 may be a software program that operates on a desktop operating system such as LINUX, MICROSOFT WINDOWS, MAC OS, or CHROME OS. In yet another case, an application 130 may be a built-in application in an IoT device. An application 130 may include a graphical user interface (GUI) that visually renders data and information. An application 130 may include tools for training machine leaning models 140 and/or perform inference using the trained machine learning models 140.

Machine learning models 140 may include different types of algorithms for making inferences based on the training of the models. Examples of machine learning models 140 include regression models, random forest models, support vector machines (SVMs) such as kernel SVMs, and artificial neural networks (ANNs) such as convolutional network networks (CNNs), recurrent network networks (RNNs), autoencoders, long short term memory (LSTM), reinforcement learning (RL) models. A machine learning model 140 may be an independent model that is run by a processor. A machine learning model 140 may also be part of a software application 130. Machine learning models 140 may perform various tasks.

By way of example, a machine learning model 140 may receive sensed inputs representing images, videos, audio signals, sensor signals, data related to network traffic, financial transaction data, communication signals (e.g., emails, text messages and instant messages), documents, insurance records, biometric information, parameters for manufacturing process (e.g., semiconductor fabrication parameters), inventory patterns, energy or power usage patterns, data representing genes, results of scientific experiments or parameters associated with the operation of a machine (e.g., vehicle operation) and medical treatment data. The machine learning model 140 may process such inputs and produce an output representing, among others, identification of objects shown in an image, identification of recognized gestures, classification of digital images as pornographic or non-pornographic, identification of email messages as unsolicited bulk email ('spam') or legitimate email ('non-spam'), prediction of a trend in financial market, prediction of failures in a large-scale power system, identification of a speaker in an audio recording, classification of loan applicants as good or bad credit risks, identification of network traffic as malicious or benign, identity of a person appearing in the image, processed natural language processing, weather forecast results, patterns of a person's behavior, control signals for machines (e.g., automatic vehicle navigation), gene expression and protein interactions, analytic information on access to resources on a network, parameters for optimizing a manufacturing process, predicted inventory, predicted energy usage in a building or facility, web analytics (e.g., predicting which link or advertisement that users are likely to click), identification of anomalous patterns in insurance records, prediction on results of experiments, indication of illness that a person is likely to experience, selection of contents that may be of interest to a user, indication on prediction of a person's behavior (e.g., ticket purchase, no-show behavior), prediction on election, prediction/detection of adverse events, a string of texts in the image, indication representing topic in text, and a summary of text or prediction on reaction to medical treatments. The underlying representation (e.g., photo, audio and etc.) can be stored in system memory 108 and/or storage unit 110.

Input interface 114 receives data from external sources such as sensor data or action information. Output interface 116 is a component for providing the result of computations in various forms (e.g., image or audio signals). Computing device 100 may include various types of input or output interfaces, such as displays, keyboards, cameras, microphones, speakers, antennas, fingerprint sensors, touch sensors, and other measurement sensors. Some input interface 114 may directly work with a machine learning model 140 to perform various functions. For example, a sensor may use a machine learning model 140 to infer interpretations of measurements. Output interface 116 may be in communication with humans, robotic agents or other computing devices.

The network interface 118 enables the computing device 100 to communicate with other computing devices via a network. The networks may include, but are not limited to, Local Area Networks (LANs) (e.g., an Ethernet or corporate network) and Wide Area Networks (WANs). When multiple nodes or components of a single node of a machine learning model 140 is embodied in multiple computing devices, information associated with various processes in the machine learning model 140, such as temporal sequencing, spatial pooling and management of nodes may be communicated between computing devices via the network interface 118.

Example Neural Network Architecture

Figure 2:
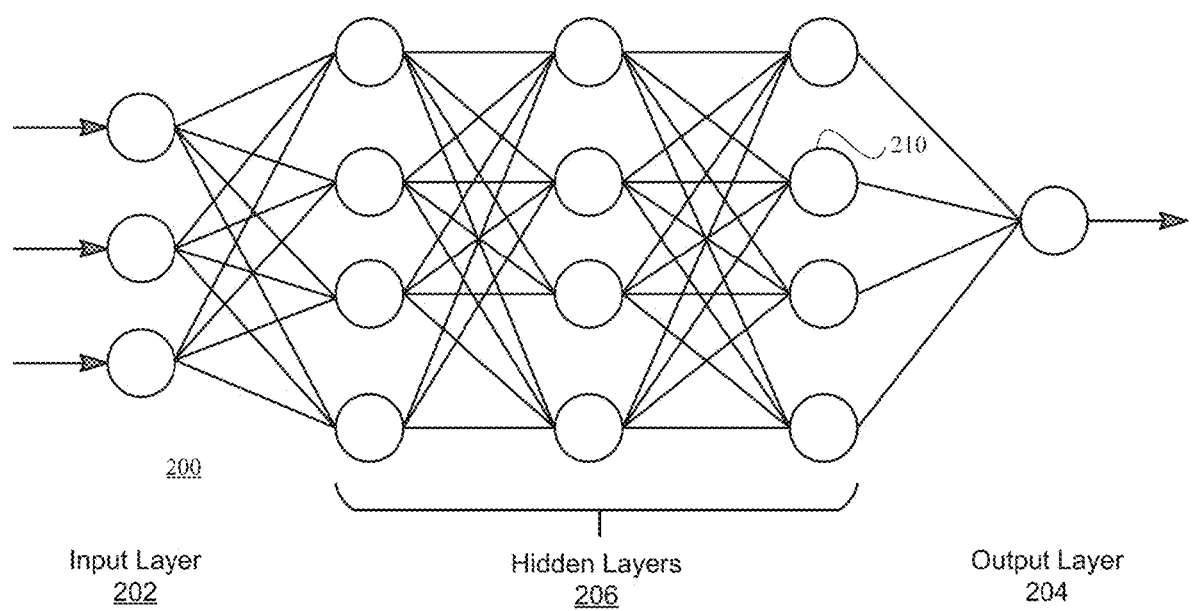
FIG. 2 is a conceptual diagram illustrating an example architecture of a neural network, according to an embodiment.

FIG. 2 is a conceptual diagram illustrating an example architecture of a neural network 200, according to an embodiment. The illustrated neural network 200 shows a generic structure of a neural network. Neural network 200 may represent different types of neural networks, including convolutional network networks (CNNs), recurrent network networks (RNNs), autoencoders, and long short term memory (LSTM). In various embodiments, customized changes may be made to this general structure.

Neural network 200 includes an input layer 202, an output layer 204 and one or more hidden layers 206. Input layer 202 is the first layer of neural network 200. Input layer 202 receives input data, such as image data, speech data, text, etc. Output layer 204 is the last layer of neural network 200. Output layer 204 may generate one or more inferences in the form of classifications or probabilities. Neural network 200 may include any number of hidden layers 206. Hidden layer 200 are intermediate layers in neural network 200 that perform various operations. Neural network 200 may include additional or fewer layers than the example shown in FIG. 2. Each layer may include one or more nodes 210. The number of nodes in each layer in the neural network 200 shown in FIG. 2 is an example only. A node 210 may be associated with certain weights and activation functions. In various embodiments, the nodes 210 in neural network 200 may be fully connected or partially connected.

Each node 210 in neural network 200 may be associated with different operations. For example, in a simple form, neural network 200 may be a vanilla neural network whose nodes are each associated with a set of linear weight coefficients and an activation function. In another embodiment, neural network 200 may be an example convolutional neural network (CNN). In this example CNN, nodes 210 in one layer may be associated with convolution operations with kernels as weights that are adjustable in the training process. Nodes 210 in another layer may be associated with spatial pooling operations. In yet another embodiment, neural network 200 may be a recurrent neural network (RNN) whose nodes may be associated with more complicated structures such as loops and gates. In a neural network 200, each node may represent a different structure and have different weight values and a different activation function.

In various embodiments, a wide variety of machine learning techniques may be used in training neural network 200. Neural network 200 may be associated with an objective function (also commonly referred to as a loss function), which generates a metric value that describes the objective goal of the training process. The training may intend to reduce the error rate of the model in generating predictions. In such a case, the objective function may monitor the error rate of neural network 200. For example, in object recognition (e.g., object detection and classification), the objective function of neural network 200 may be the training error rate in classifying objects in a training set. Other forms of objective functions may also be used. In various embodiments, the error rate may be measured as cross-entropy loss, L1 loss (e.g., the sum of absolute differences between the predicted values and the actual value), L2 loss (e.g., the sum of squared distances) or their combinations.

Training of neural network 200 may include forward propagation and backpropagation. In forward propagation, neural network 200 performs the computation in the forward direction based on outputs of a preceding layer. The operation of a node 210 may be defined by one or more functions, such as a linear operation and a non-linear activation. Common linear operations include convolutions, tensor multiplications, and dot products. Common activation functions include a step function, a sigmoid function, a hyperbolic tangent function (tan h), and a rectified linear unit function (ReLU). The functions that define the operation of a node 210 may include various computation operations such as convolution of data with one or more kernels, pooling, recurrent loop in RNN, various gates in LSTM, etc. The functions may also include an activation function that adjusts the output of the node.

Each of the functions in neural network 200 may be associated with different coefficients (e.g., weights and kernel coefficients) that are adjustable during training. After an input is provided to neural network 200 and passes through neural network 200 in the forward direction, the results may be compared to the training labels or other values in the training set to determine the neural network's performance. The process of prediction may be repeated for other samples in the training sets to compute the overall value of the objective function in a particular training round. In turn, neural network 200 performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., neural network 200 has converged) or after a predetermined number of rounds for a particular set of training samples. The trained neural network 200 can be used for making inferences or another suitable task for which the model is trained.

Example Circuitry for AI Accelerator

Figure 3:
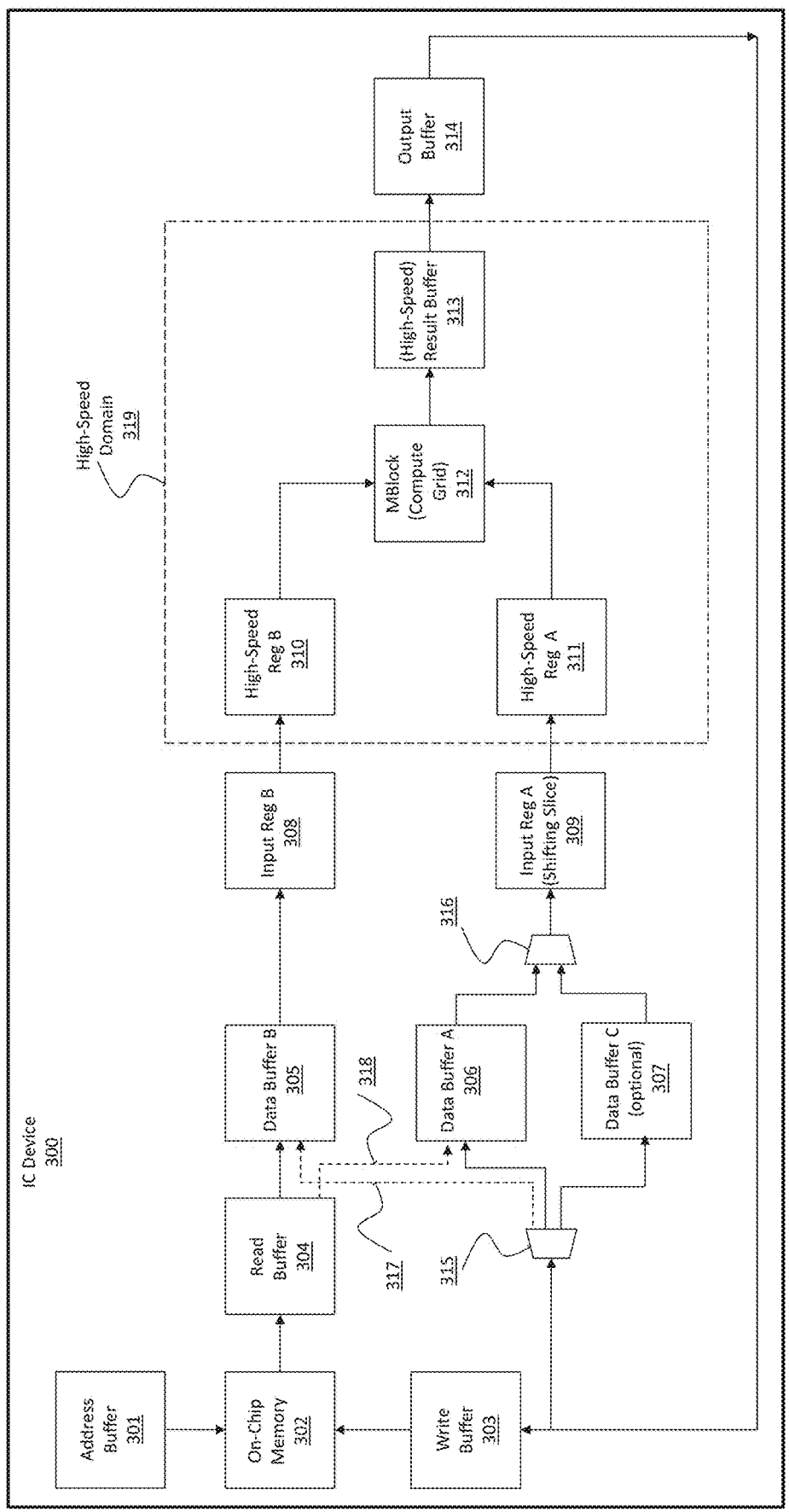
FIG. 3 is a block diagram illustrating circuitry and hardware architecture of an example AI accelerator, according to an embodiment.

FIG. 3 is a block diagram illustrating circuitry and hardware architecture of an example AI accelerator 300, according to an embodiment. AI accelerator 300 may be a circuit that is efficient at performing operations related to a neural network. AI accelerator 300 may be an example of AI accelerator 104 or may also be embedded as part of a larger processor, such as CPU 102. In various embodiments, AI accelerator 300 may include fewer or additional components than the example shown in FIG. 3. For example, in one embodiment, AI accelerator 300 shown in FIG. 3 only illustrates blocks that are relevant to computations related to accelerating the operation of a neural network and other components may not be shown. In one embodiment, AI accelerator 300 includes only Data Buffer A and not Data Buffer C. In various embodiments, AI accelerator 300 may include fewer, additional, or different components. Components such as I/O and controllers are omitted for simplicity sake. While some of the components shown in FIG. 3 are illustrated as having one copy, in various embodiments the AI accelerator 300 may have multiple copies of the same components. For example, the AI accelerator 300 may have multiple multiplication block circuits.

In ANN, such as on FIG. 2, input data is often depicted as arrows coming into the network from the left, and the network itself is represented by nodes and connecting arrows. Output data shows at the right.

In practice, the network is modeled as per the diagram. One can see the input data as a set of tensor data (e.g., the RGB pixel map planes of an image captured in color), and the network can be seen as a set of layers, which each process data from its input side to its output side. The processing can be one of pooling layers, convolutional layers, and fully connected layers. There are more types of layers possible, and there are also techniques for deep learning and backwards propagation.

Each of such layers has, in additional to specified connections, also a set of weights. These weights need proper values (training) to make the network respond optimally in terms of desired output for any given input.

In FIG. 3 we illustrate how the network is fed into the AI processor architecture. Both input data and network weights values are stored in the On-Chip Memory 302. The input data is first obtained from external sources such as system 108 (omitted in FIG. 3) and then stored in the On-Chip Memory 302. The input data is then transferred through the Read Buffer 304 into the IC, optionally through connection 318. If wire 318 is omitted, this data is transferred into Data Buffer B and then the data is rapidly pushed to the Output Buffer 314. The data is loaded through switch 315 into Data Buffer A. For this discussion we assume that connection 318 is present.

With the input data loaded in Data Buffer A, the weights are then loaded into Data Buffer B 305 using the standard connection between Read Buffer 304 and Data Buffer 305. An exception is for the fully connected layer, during which the data is arranged in rows in Data Buffer A 306 and in columns in Data Buffer B 305. Typically, the data for Data Buffer B 305 is also loaded from the On-Chip Memory 302. The IC device 300 allows for this data to also be output data, using connection 317. For this connection 317, the path from switch 315 to Data Buffer B 305 needs to be present. This is optionally drawn, as it can also be formed by e.g. a connection between Data Buffer C 307 and Input Register 308. In one embodiment, Data Buffer C 307 is present. Also, depending on the purpose of the Processor, this connection may not be necessary.

At this point, after the first loading from memory, the computation has been configured for execution of the first layer in the ANN. The controls for this are also stored in the On-Chip Memory 302, and are then loaded into a Controller (not shown). The controller is capable of configuring the operating to take place in the Mblock (such as pooling, convolution, or fully connected), and the relevant sizing information (layers typically reduce in size on a layer-by-layer basis). This controller also handles the Tensor (depth) of the layers.

To execute the first layer, both Data Buffers A and B present their data onto Input Registers A 309 and B 308. One may view these buffers as a 3-D architecture—they have a width, a height, and a depth. The first layer we name a Slice, and this slice can be part of the Data Buffer, or we can show this as an explicit Slice, as we have done in FIG. 3. Input Reg A is a 2-D shift register array which has the ability to shift in both horizontal and vertical dimension. Input Register B does not need to have this property.

IC device 300 may include a High-Speed Domain 319 which can operate at a faster clock than the basic domain. This is an optimization that one can entertain. In such as case, the High-Speed Registers A 311 and B 310, as well as the (High-Speed) Result Buffer 313, after which the data is brought back to the main clock domain in the Output Buffer 314.

If such as optimization is done, the MBlock (Compute Grid) 312 can operate at a faster clock frequency than the main domain, which is operating at 'memory load and store' speeds.

ANNs are resolved layer by layer. Each layer has an input side, a defined connection (operation), and a set of weight values (kernel weights). In this context, one can view the input for each layer as the Data Buffer A 306, the weight factors as Data Buffer B, and the output values as (going towards) Data Buffer C (when present, otherwise Data Buffer A is overloaded).

Once the network layer computation has been completed, Data Buffer A will be emptied, and Data Buffer C will be loaded. Similarly, Data Buffer B has been consumed, and is refilled with weight values for the next layer operation. At this point, Data Buffer A and Data Buffer C switch roles, using switch 316. Data Buffer C will now stream the data, while Data Buffer A collects the results. Each next layer will reverse such roles.

At the very end, the result of the ANN is stored back into the On-Chip Memory 302 through Write Buffer 303. This often is just a scalar. However, for debug and training, one may want to view all intermediate data values, at which point all data from Output Buffer 314 is written back to the On-Chip Memory 302 using Write Buffer 303. Depending on configurations, this can increase the network computation (solving) time. In inference mode, this is not done, so the network can be solved in optimal time.

Three well-recognized ANN examples: ResNet-50, VGG-16, and BERT-Base:

TABLE 1

|  | ResNet-50 | VGG-16 | BERT-Base |
| --- | --- | --- | --- |
| Data Input Size | 224 × 224 × 3 | 224 × 224 × 3 | 512 × 768 |
| Number of layers | 50 | 16 | 333 (12 Tr, 12 Att) |
| Largest Data (A) | 802,816 | 3,211,264 | 4,722,432 |
| Largest Param (B) | 2,359,296 | 102,760,448 | 23,040,000 |
| Total Param | 20,910,272 | 138,268,456 | 109,705,010 |
| Mappable? | Yes | Yes | Yes |

Of these three examples, ResNet-50 has become very popular for benchmarking and visual networks given its performance and smaller footprint. VGG-16 was an earlier network, in which the fully connected layer in the final step amounts to 102M parameters, causing problems with certain AI accelerators. BERT-base (and BERT-large) is a Transactor/Attention type of layer which also has a large set of parameters, 110M (and 340M respectively).

In one embodiment, the On-Chip Memory 302 has a memory size that can hold the entire network parameter data plus the input data, the output, and some level of debug data. In 16-bit mapping, such as FP16, each parameter is represented by a 16-bit data-word, a Byte.

Using Bytes, for current networks 1 GB terms seems sufficient. The Data Buffers A, B, and C, should be configured at 4 MB terms each, as a minimum, to map all networks. This is insufficient for the parameters sets that exceed this, such as the 102 MB VGG-16 layer in the fully connected layer. Depending on the embodiments and intended neural networks, the size and configuration of the On-Chip memory 302 and various buffers can be scaled accordingly.

Depiction of the Data Presentation to the Compute Grid

Figure 4:
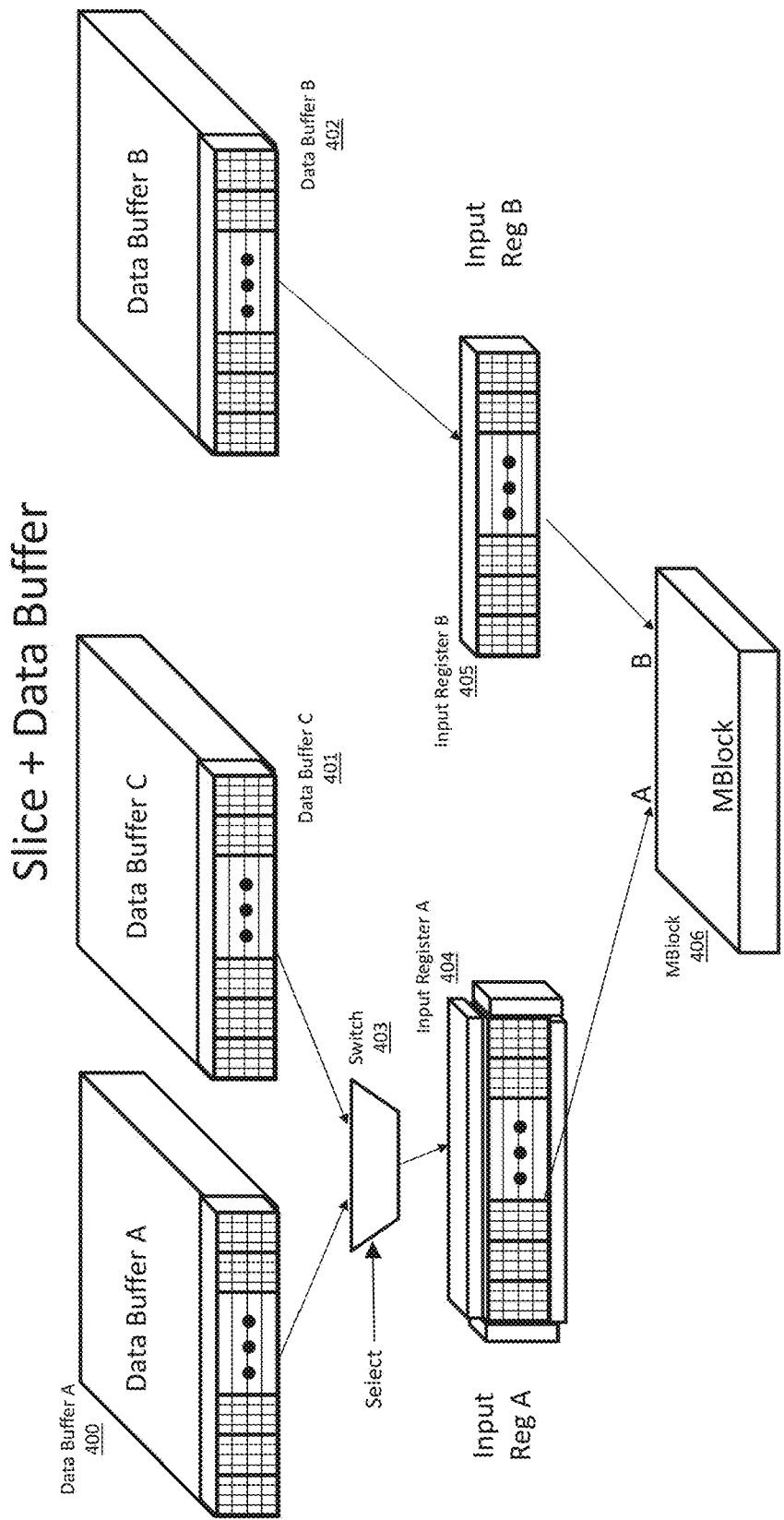
FIG. 4 is a conceptual diagram of how the data buffers are connected, each data buffer is shown in a 3-D visualization, with the shifting slice explicitly shown, according to an embodiment.

The MBlock 406, shown in FIG. 4 is an example of a Compute Grid. This is essentially a linear array of Processing Elements, each capable of e.g., computing Dot Product terms. For example, a Processing element can be a multiply-accumulate circuit (MAC). In one embodiment, Data Buffer A 400 is an example of Data Buffer A 306 in FIG. 3; Data Buffer B 402 is an example of Data Buffer B 305; Data Buffer C 401 is an example of Data Buffer C 307; and input register A 404 is an example of Input Register A 309.

The MBlock has two input sides, A and B, which are connected to the Input Registers. Please note that this is a conceptual figure. For example, the High-Speed domain steps are omitted in this figure. Both Input Register A 404 and Input Register B 405 are shown (and not the High-Speed Input Registers) with Input Register A 404 shown as a shifting slice, which can move the data in the grid to its nearest neighbors in an up/down/left/right fashion. The depth of shifting is determined by the maximum kernel size to be presented.

In one embodiment, a Switch Element 403 is present between the Data Buffers A 400 and C 401 and the Shifting Input Register A 404. This can be reversed, at which point both Data Buffers would have to include a shifting slice for their first layer.

In this figure one can now imagine how data buffers move data to the MBlock Compute Grid. Data Buffer A (and C) can move data into the Input Register 404. The Input Register 404 can then shift the data around. Similarly, Data Buffer B 402 pushes data into Input Register B 405. In this step the AI processor allows for Hardware Replication. It is to be understood that the Input Register will have an array of weight values configured within. For small kernels, a lot of this data is to be replicated (same data multiple times). Data Buffer A (and also Data Buffer C) and Data Buffer B can pump data into their input registers as needed—both have configuration settings for the layer size, the layer depth (Data Buffer A or Data Buffer C), the number of channels (Data Buffer A, Data Buffer B, Data Buffer C), the number of filters/kernels (Data Buffer B), and the number of shifting steps (e.g., 144 for a 12×12 kernel).

Depiction of the Data Presentation to the Compute Grid

Figure 5:
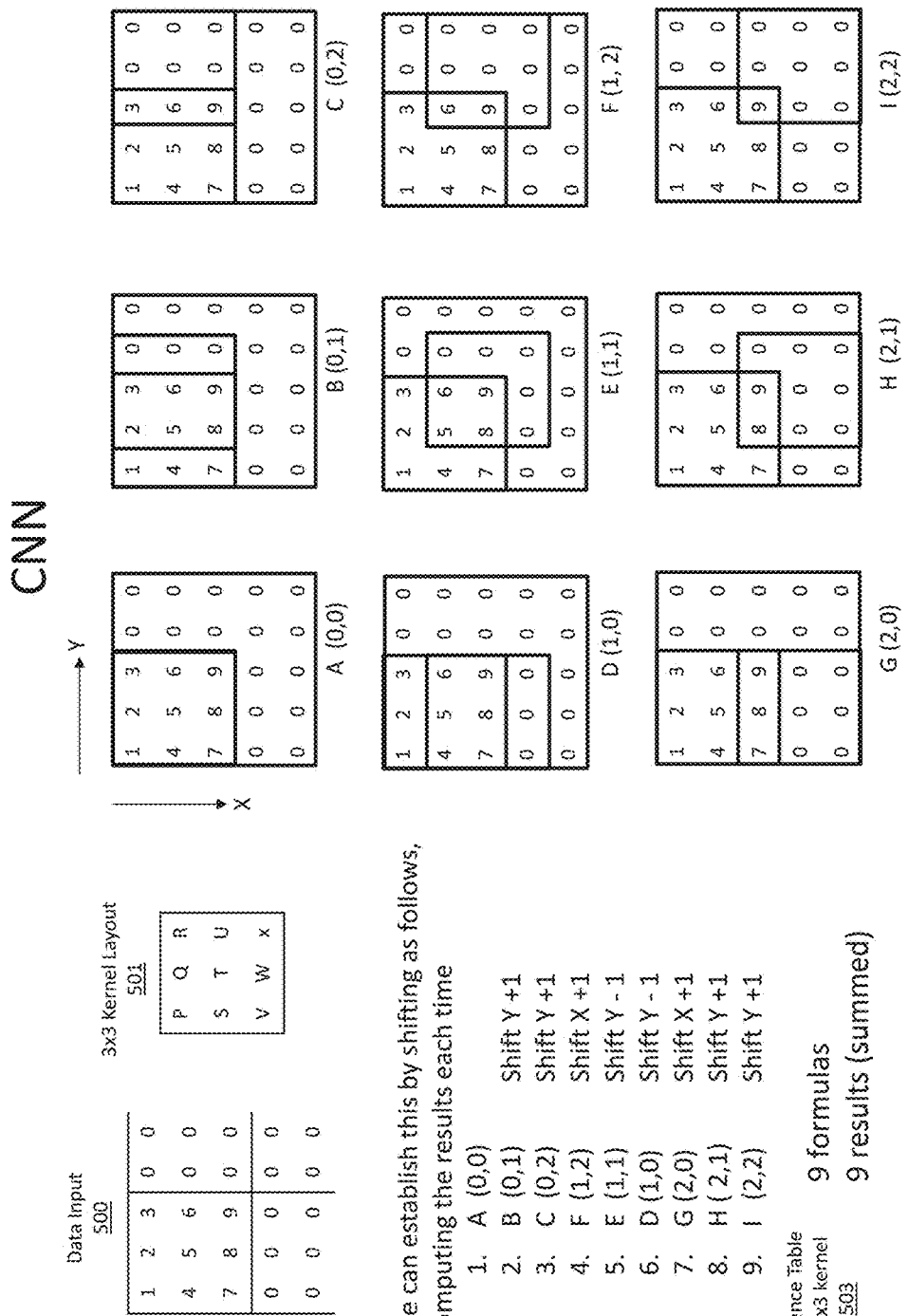
FIG. 5 is an illustration of how a 3×3 kernel uses 9 shifts for accumulation, according to an embodiment, using a padding of 2.

FIG. 5 shows an example operation of convolution in an ANN for a 3×3 kernel with weight values.

The AI processor according to an embodiment supports all types of convolution padding and stride. As an example, only stride 1 is described below, but other striding can also be performed. The AI processor supports 1D, 2D, 3D, and other N-dimensional kernels. As an example, only 2D kernel is described below.

For Zero Padding, three types are typical: Valid Padding, Same or Half Padding, and Full Padding. We expect that the reader is familiar with this. For a given input size of N (assuming X and Y being equal in length), padding size P, a kernel size k, and stride S, then the output O will be:

$$O = \frac{N-k+2P}{S} + 1.$$

It then follows that the programmer can shrink the output, maintain the input size, or grow the output size by choosing a value of P (and thus implying Valid, Same (or Half), and Full padding), per Table 2.

TABLE 2

| Type | S | P | O (formula) | O (result) | Result Map |
|---|---|---|---|---|---|
| Valid Padding | 1 | P = 0 | $\frac{N-k+0}{1}+1$ | N − k + 1 | Shrinks |
| Same Padding | 1 | P = (k − 1)/2 | $\frac{N-k+2(k-1)/2}{1}+1$ | N | Equal |
| Full Padding | 1 | P = (k − 1) | $\frac{N-k+2(k-1)}{1}+1$ | N + k − 1 | Grows |

An embodiment handles kernel sizes of 3, 6 and 12 (that is, 3×3, 6×6, and 12×12). To support Full Padding, (k−1), or 11 rows and 11 columns may be added to the slice depicted in Input Register A 404.

In a typical implementation, such rows and columns are added around the input matrix at all sides. An optimization for an embodiment is to only add rows to the bottom, and columns to the right. Although this optimization is not necessary for an embodiment, it greatly simplifies the computation. In one embodiment, if padding were added around the input data at all sides, the upper left, (0,0), position moves into the padding area and the first data position "1" in Data Input 500 then moves to an off-set location based on the kernel size and padding value.

By adding the padding only in the positive direction (increased X and Y values), the mapping may start at the A (0,0) position, shown in the visualization steps 502. The AI accelerator may walk the entire input data (N+2P) in both X and Y as shown in the Sequence Table 503, incrementing or decrementing only one of X or Y, i.e., the AI accelerator shifts the data in the slice Input Register A 404 in one direction at a time.

The Visualization of steps 502 depicts an input data of 3×3, with padding of 2, and a kernel of 3×3. The resulting Output 504 again forms a 3×3 matrix. Also shown is Output 505, which would be the result for Valid Padding, P=0.

Furthermore, it should be understood that the output value A in Output 504 is the dot product calculation of the first position, output value B in Output 504 is the dot product calculation of the second position and so forth. Note that Data Input 500 can have multiple channels, that have to be summed in output Value A. Also note that the 3×3 Kernel layout 501 can have multiple filters (channels) which all apply to the same Data Input 500.

As explained in FIG. 4, Input Reg A 404 and Input Reg B 405 can be manipulated independently. Aside from packing and folding techniques, the AI accelerator may also use replication for small data sets, such as small input data or small kernel data. Such optimizations require both Input Reg A and Input Reg B to be manipulated independently.

Depiction of Shifting Register and 2D Mapping

Figure 6:
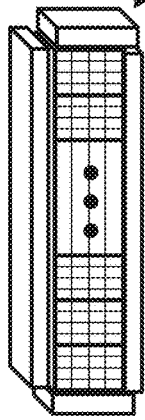
FIG. 6 is a realization of FIG. 5 using the shifting slice Input Reg A from FIG. 4, according to an embodiment.

FIG. 6 depicts how the shifting buffer Input Register A is mapped onto a compute grid. The 12×12 Section 602 depicts 12 rows and 12 columns that are grouped in 16 sections of 9 terms each (in a 3×3 arrangement).

From the Sequence Table 601 it can be derived that the shifting slice of Input Register A, now in hardware, enables the same sequence shifting pattern as described in FIG. 5, only requiring one shift per clock cycle.

It also follows from the FIG. 5 discussion, that there should be (k−1) rows and (k−1) columns added for Zero-Padding options. For allowing 3×3, 6×6, and 12×12 kernels, the 12×12 kernel represents the worst case: this amounts to adding 11 extra rows and 11 extra columns.

Next, we will explain how this structure enables CNN to become a parallelized operation in hardware.

CNN Parallel Operation Explained

Figure 7:
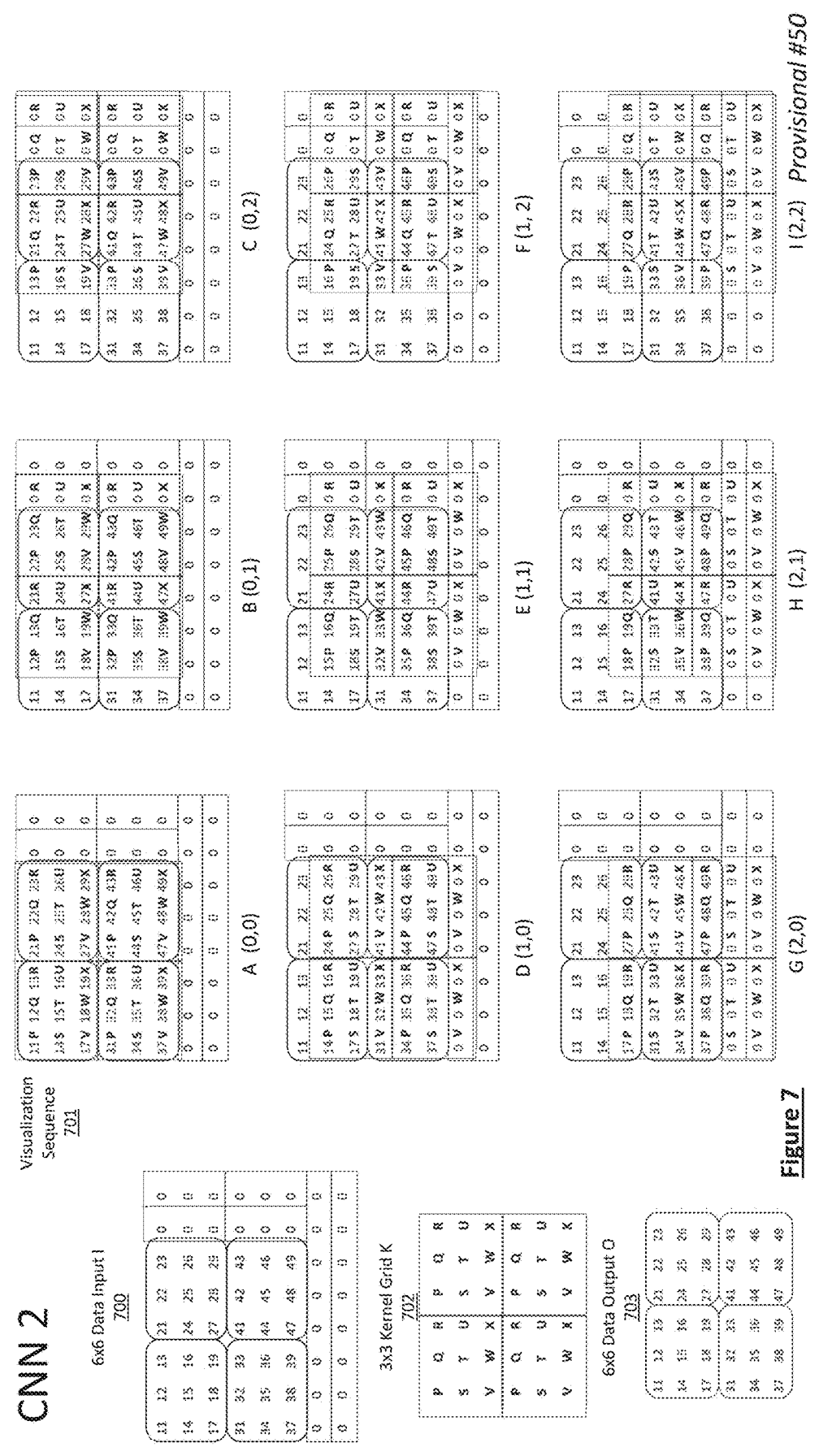

FIG. 7 shows how CNN can be done in parallel by shifting the Input Register 600 following the Sequence Table 601. Input Register 600 may be an example of Input Registers 308 and 309 in FIG. 3.

In one embodiment, the compute grid is a 12×12 grid. This is a choice that can be made. In FIG. 7 we show a grid of 6×6 with a kernel of 3×3 to explain the mechanism. This is shown as Data Input 700. We also show a 3×3 Kernel Grid 702, which has only one 3×3 kernel {P,Q,R,S,T,U,V,W,X} and is repeated four times to form the grid.

Next, the AI accelerator overlays the Data Input with the Kernel Grid and show the terms that are then calculated for such position. E.g., in position A (0,0) we can see these terms:

$$O11 = 11P + 12Q + 13R + 14S + 15T + 16U + 17V + 18W + 19X$$

$$O12 = 12P + 13Q + 21R + 15S + 16T + 24U + 18V + 19W + 27X$$

and so on until we reach $$O19 = 19P + 27Q + 28R + 33S + 41T + 42U + 36V + 44W + 45X$$

This is the result for the first quadrant, O11 through O19. Similarly, O21 through O29 are observed, and the same applies through O31 through O39, and O41 through O49.

In all, 36 output terms are calculated. Normally, 3×3 kernel {P,Q,R,S,T,U,V,W,X} would be stepped-and-repeated 36 times to compute each resulting term for the given problem. The 36 follows from the size of the input matrix (N=6) versus the size of the kernel matrix (K=3), and same padding (P=2). Each dimension requires (N+P+1−K)=6 steps, thus 6×6=36 for all positions. If, in another example, we enlarge the input size to e.g., N=124, then each dimension requires (N+P+1−K)=(124+2+1−3)=124 steps, resulting in 124×124=15,376 positions.

However, in one embodiment, both problems require only 9 positions, as the AI accelerator may resolve the problem in parallel. For the N=6 problem depicted in FIG. 7, we have drawn all 9 positions in Visualization Sequence 701: A (0,0) through I (2,2). Since Kernel Grid 702 has four kernels included in the grid, each position computes four output matrices in parallel. E.g., at the A position, O11 is computed in the light gray area starting with 11P, whereas O22 is computed in the darker gray area starting with 21P. Similarly, O31 is computed in darker gray area starting with 31P, and O41 is computed in the lighter gray area starting with 41P.

In this example, the 6×6 Data Input I 700 matrix holds $INT((N+P)/K)^2=INT(6+2/3)^2=2^2=4$ 3×3 Kernels, as shown in 3×3 Kernel Grid. With 9 steps this resolves to 4×9=36 positions that are computed.

In another example, for N=124, the input matrix can hold $INT((N+P)/K)^2=INT((124+2)/3)^2=42^2=1,764$ kernels in the Kernel Grid K. Now, 1,764×9=15,876 positions are computed in 9 steps, assuming that all kernels fit in Input Reg B 405. If not, Input Reg B has to be repeated as many times as is needed to fit all 1,764 kernels. E.g., if Input Reg B can hold 1,000 kernels, two slices may be used for this mapping, and it would take 2 times 9=18 steps, rather than 9 steps, to perform all calculations.

Note that the two numbers, 15,876 and 15,376 do not match. This is caused by the repeat pattern forming a grid, and the grid overlapping the data can result in terms that do not contribute: in an example, assume that N=4, and not 6, in Data Input I 700. To compute all positions, 4×4=16 steps are required, whereas our mapping would remain identical—except that the 2 rows of padding now replace the columns starting with 22 and 34, and the rows starting with 34 and 37. The AI accelerator may compute 4×9=36 solutions, even though only 16 are valid. E.g., the position B (0, 1) has no data for 22P through 28 W and for 42P through 49 W, so these 2 positions are redundant. Similarly, in D (1,0), the two positions 34P through 39U and 44P thru 49U have no data and are redundant. In all, 20 such positions can be identified in this case, resulting in 36−20=16 valid positions.

However, regardless of these redundant positions, the calculation time is related to the kernel size, not the data input size. So, for 3×3 kernels, there are 9 steps, for 6×6 kernels, there are 36 steps, and for 12×12 kernels, there are 144 steps.

In one embodiment, kernel sizes that appear in between 1 and 12 are mapped to the next size up, of 3×3, 6×6, and 12×12, that fits, them, e.g., a 7×7 kernel maps to a 12×12 in the proposed embodiment, and a 4×4 kernel maps into a 6×6 kernel. This causes inefficiencies, e.g., a 7×7 kernel needs 49 steps, and not 144 steps as our mapping resolves, and, similarly, 4×4 kernel needs 16 steps, and not 36 steps in our mapping. However, such effects are mitigated by the overall network mapping. The impact of this is not significant for typical networks (most compute time is overshadowed by 3×3 kernels in popular networks).

It should be clear that by dimensioning Input Register A and by selecting a larger section (we use 12×12) this efficiency can be increased. There are additional optimizations possible, such as folding and packing (reusing the empty space in Input Register A when the data is small, or reusing the data load when the number of kernels is large).

Next, we point out that if 3×3 Kernel Grid K 702 represents a 6×6 kernel, it should be obvious to the reader that the result for each 6×6 position can be formed by summing together all the underlying 3×3 kernel results at that position. In other words, a 6×6 kernel requires no different dot product calculation. The 3×3 results are valid, and then summed together to form the 6×6 result.

Not shown in the figure is that a 6×6 CNN, in our approach, requires 36 positions (not 9, as shown) to form again a 6×6 resulting data matrix.

Similarly, a 12×12 kernel CNN result can be obtained again by summing the terms in the (already summed-up) 6×6 result, assuming that we use a 3×3 base kernel, and then a 4×4 arrangement of such base kernels, and this pattern repeated again in another 4×4 pattern.

For 12×12 kernels, 144 positions are realized, and the 3×3 kernel calculations are summed twice—once for 6×6 and then again for 12×12 results.

In one embodiment, kernel sizes are supported from 1 through 12, with 12 being the maximum. These kernels need binning, e.g., a 4×4 kernel maps to the 6×6 level, whereas the 3×3 kernel maps to the 3×3 level. A kernel larger than 12 cannot be accommodated and should be broken down in sub-kernels. It should also be noted that datasets may also follow a similar binning. Each data-set is binned to a select modulo 12 set of 12×12 sections that are supported in the control flow. Not all configurations need to be present for the architecture to work. More configurations allow more optimizations, resulting in faster network computations when such configurations do apply.

12×12 Kernel

FIG. 8 shows an embodiment operates on the 12×12 Section, which is built up out of sixteen 3×3 Sections. We also show the 6×6 Section arrangement, of which there are four, and the 12×12 Section, of which there is just a single one. This forms our basic structure in the hardware: a grid of 3×3 sections is grouped into groups of 4 which represents a 6×6 section, and this is grouped again in groups of 4 to represent a 12×12 section. Each 3×3 section connects to an MChain. Each MChain receives then 9 values from Input Register A 404 and 9 values from Input Register B 405 and computes the dot product of said values. This by itself constitutes a 3×3 result, and four such MChains work together to produce a 6×6 results, and again 4 such groups (or 16 3×3 groups) work together to produce a 12×12 result.

This is one aspect. The other aspect is that Table 601 holds 9 positions for a 3×3 kernel, 16 positions for a 6×6 kernel, and 144 positions for a 12×12 kernel.

Input Register A 404 and Input Register B 405 are then dimensioned to include many such 12×12 Sections to enable AI acceleration. Such sections can be laid out in a long array, or can be formed out of a 2D configuration of 12×12 Sections. Note that 12×12 sections is only one example, it can be realized using different numbers, as long as proper grouping is arranged when increasing the structural kernel sizes (3×3, 6×6, and 9×9 in one embodiment).

There are rules to apply when the Sections are broken apart to guarantee data continuity. Further detail is explained in the Provisional Application.

Pairing Variants

Figure 9:
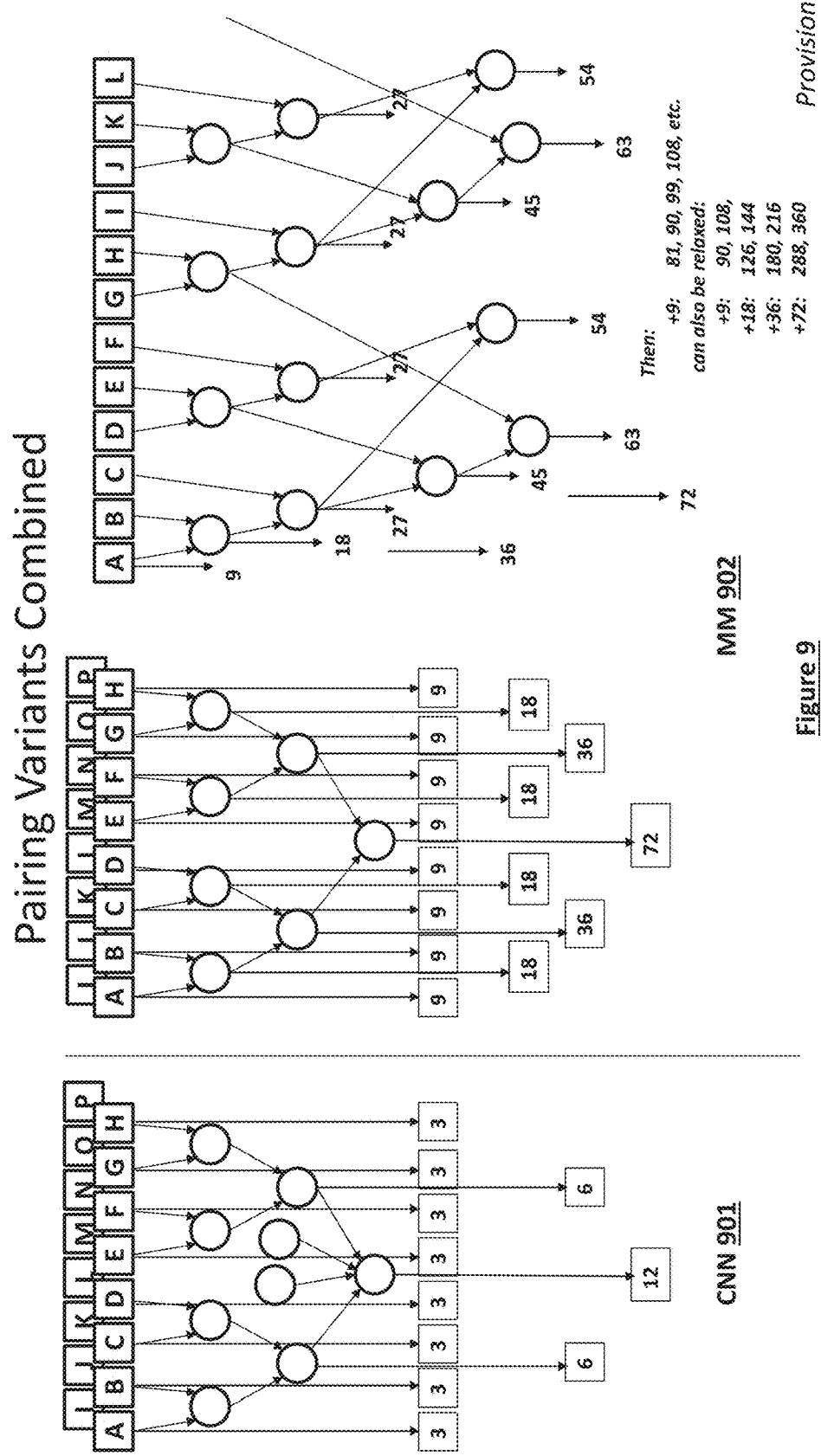
FIG. 9 shows suggested accumulation patterns. Left of CNN, right for MM, according to an embodiment.

FIG. 9 is a depiction of how summation is done per Section. On the left, at CNN 901 reflects the quadratic summation of CNN result quadrants to product the terms for the next level up. The top row {A thru P} reflects the sixteen 3×3 Sections. Each Section produces an output for a 3×3 kernel (shows as "3" at the bottom side). For the 6×6 kernel, 4 of such terms are combined (only two bubbles are shown for image simplicity). This connects to output "6" at the bottom. For the 12×12 kernel, these four 6×6 terms are combined again into one result, shown as output "12." (Here we draw the bubbles for the background, so there are four bubbles shown).

The section at the right, MM 902, we will address below when we discuss Matrix Multiplication. It uses the same summation tree, with the option to add in more pathways.

Summation may require additional clock cycles. In one embodiment this can be seen as pipelining. Note that 3×3 sections is an example, the architecture can work for other numbers.

Diagram of the 12×12 Section in the Input Buffer A

Figure 10:
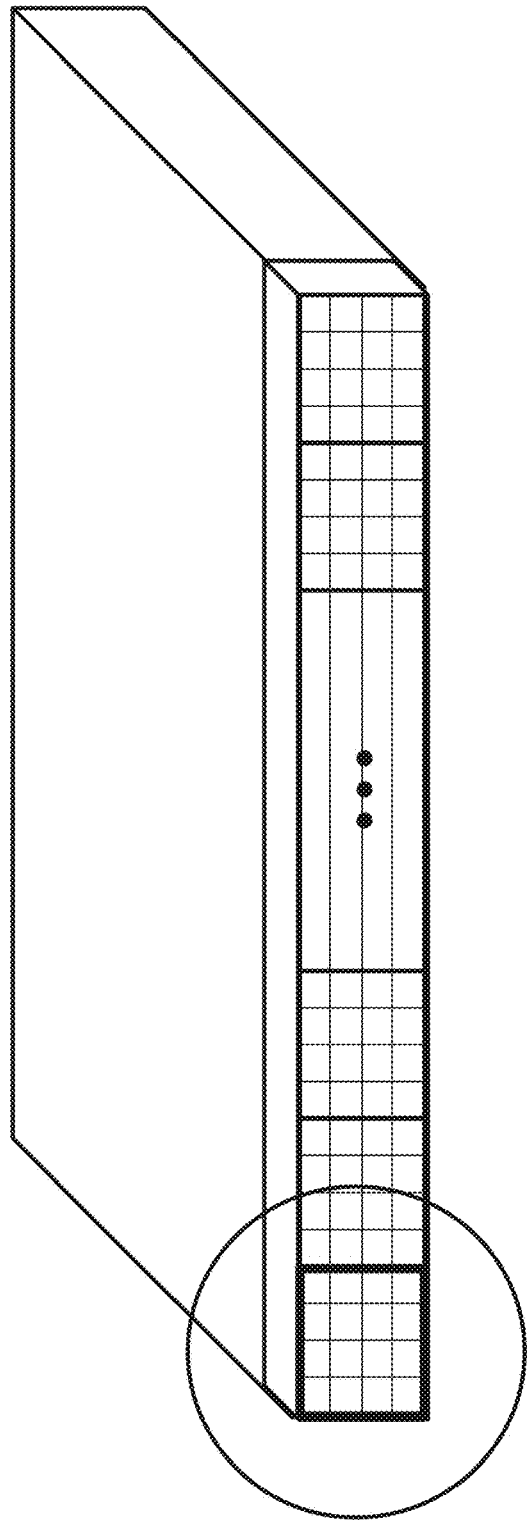
FIG. 10 shows where in the buffer the 12×12 Section is placed, according to an embodiment.

FIG. 10 shows where in the data buffer the 12×12 Section is placed, according to an embodiment. Each data buffer can be viewed as a 3-D structure, having X, Y, and D (depth). For each value of D, a slice can be imagined, only the front slice is depicted. As the buffer progresses, data is pushed in the D-direction towards the front slice, such that the entire slice loads all X and Y values in parallel each clock cycle. This can be implemented as a register array.

Furthermore, each slice is built up of multiple 12×12 sections as depicted. In this FIG. 10 as shown, a single set of 12 rows is present, and multiple sets of 12 columns are present. In one embodiment, there would be multiple sets present in both row and column direction.

As stated, the 12×12 configuration can be viewed as a 4×4 arrangement of 3×3 sections. Other variants are possible, such as 2×2 arrangement, or 4×4 sections, etc.

Data Buffer to Input Buffer Connection: A Side

Figure 11:
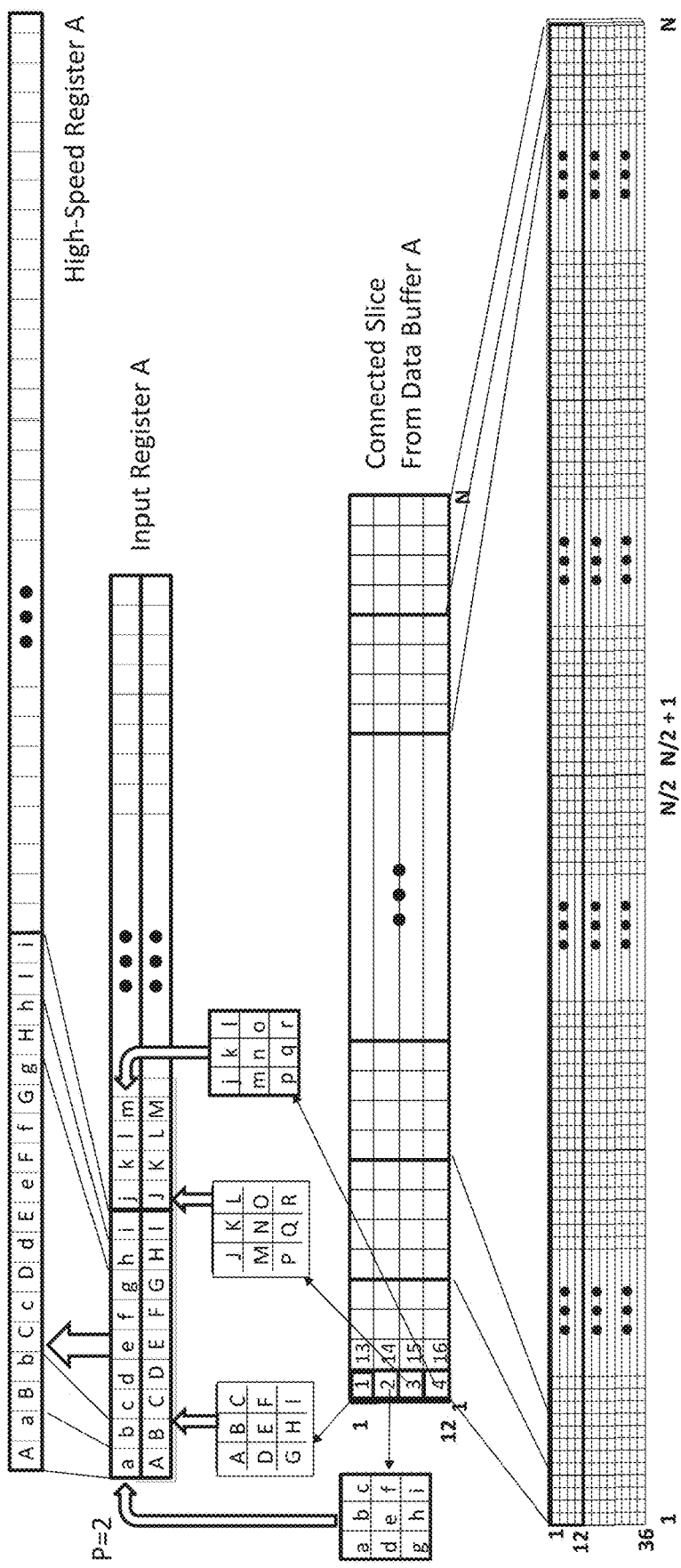
FIG. 11 details the connection pattern from the Data Buffer to the Front Slice, and then to the Input Register and High-Speed Register, according to an embodiment.

FIG. 11 shows the physical arrangement from the Data Buffer A 400 to the High-Speed Register A 311. Shown at the very bottom is Input Register A 404, which contains multiples of the 12×12 section in one embodiment. In this case we show 36 rows, or 3 such 12×12 sections as shown in FIG. 10 stacked in the row direction.

All terms in the slice are connected to the Input Buffer, but this is unwieldy to draw in a figure. Rather, we only show the first array of 12×12 sections, depicted by {1 12} and we suggest that this can hold N such sections. Essentially, we draw out the part of the slice which is shown in FIG. 10 (with 12 rows), realizing that we have to repeat this 3 times for this example (with 36 rows).

The pattern described for the first such array (12 rows), as highlighted in the diagram, is then repeated for all rows (in groups of 12 rows). Care should be taken to minimize the number of routing crossovers, as this can aid the layout requirements.

Next, we look at the first 12×12 Section, and within the first 3×3 kernels. They are numbered {1, 2, 3, 4, 13, 14, 15, 16, . . . }. This is to suggest that also rows {5, 6, 7, 8, 9, 10, 11, 12} are also included in this connection scheme. Because of the 3×3, 4 such kernels match the 12×12 Section boundary. In the figure, there are three such 12×12 sections stacked, for total index of 36.

Next we label values of the first four kernels with {a, b thru i}, {A, B thru I}, {j, k thru 1}, {J, K thru L}, and so on. Each group represent the 9 individual terms of such 3×3 kernel Section.

Then we show how we connect to a low-speed Input Register A, which has as many layers as are the clock Ratio P suggests. P is defined as the clock of the High-Speed Domain 319 divided by the main system (memory) clock as described in FIG. 3.

P should be an integer value for simplicity. In the drawing we use P=2.

Next, we show the parallel conversion from the Input Register to the High Speed register. Essentially, the grid points (terms) in the 2D arrangements from the Data Buffer slice at the bottom now form a linear array at the top in the High-Speed Register.

Please note that we stay true to the geometrical data ordering as shown in FIG. 8 in the chosen 12×12 Section arrangement, 3 levels deep (3×3, 6×6, 12×12).

Compute Grid Structure: MBlock and MChain

Figure 12:
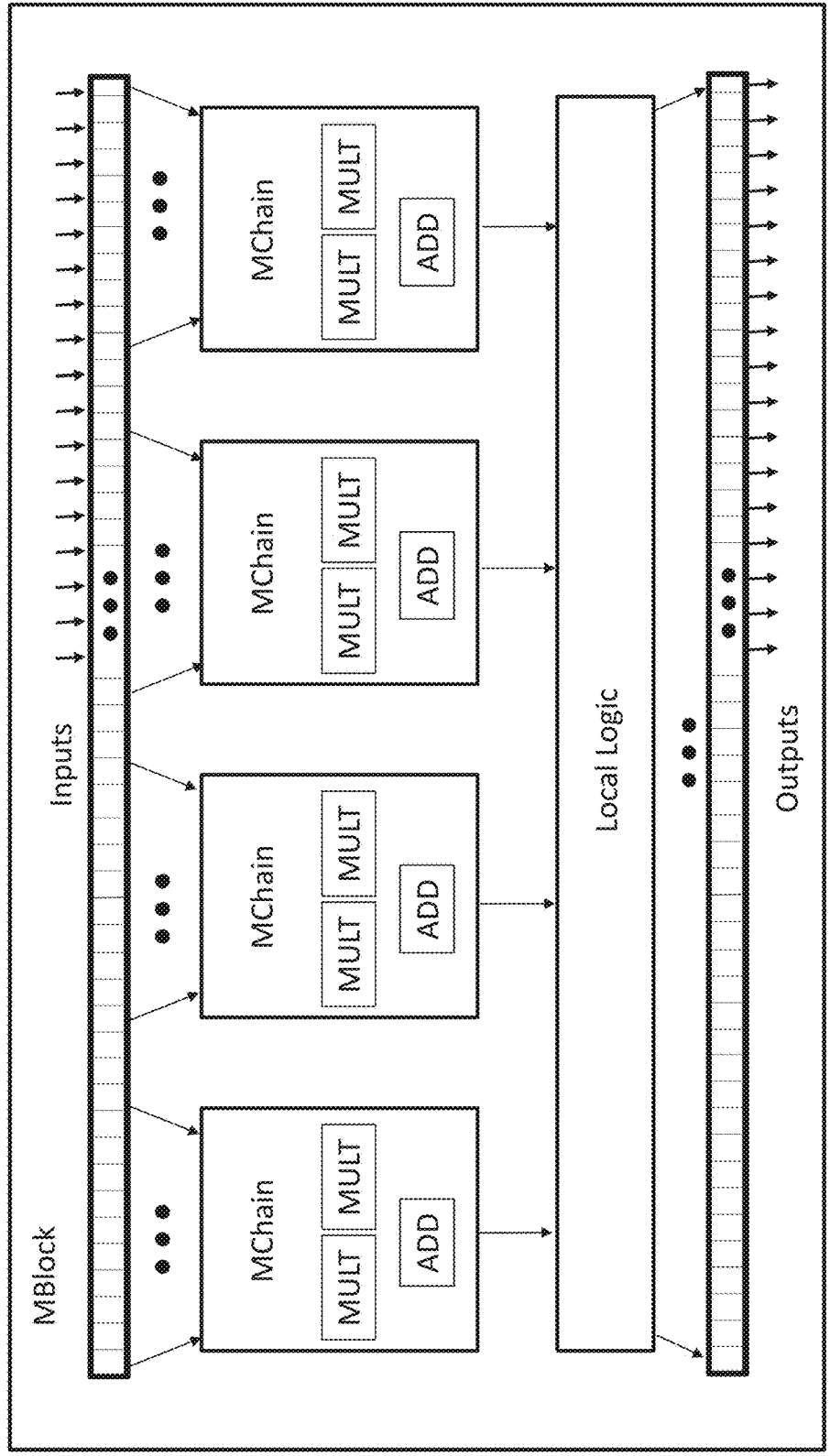
FIG. 12 shows the MChain arrangement inside the MBlock, according to an embodiment.

FIG. 12 shows a conceptual diagram of the MBlock (multiplication block circuit) and MChain (multiplication chain circuit). The MChain forms a linear array from 1 to N, N being the number of MChains. Each MChain contains a single PE. An MChain can perform dot-product (MAC) computations inside the MChain. MChain is a 'dot-product' engine, which produces the dot-product result C of two input vectors A and B: $C=\sum_{i=1}^{n} ai*bi$, where ai and bi are individual terms of the vector for each value of i.

The MBlock has many inputs, which are organized in small groups. Each group takes from both the A (includes C) and B data buffer sides. In one embodiment each such group is comprised out of 18 inputs, representing 9 inputs from the A side and 9 inputs from the B side, so that a dot product can be computed. In such a case, A and B sides could e.g., represent 3×3 matrices.

The MChain array inside the MBlock forms a fully parallel array, and differs from the following eight multi-CPU structures in the following ways:

DSP Slice: A DSP Slice structure is characterized by a Carry input and output. In the MChain array, no Carry in and no Carry out is used.

Systolic Array: A Systolic Array structure is characterized by a 2-D Grid arrangement which feeds data into Processing Elements (PE) from two sides and then feeds forward in two directions. In the MChain, no such grid is formed between PEs.

Mesh (or Grid) CPU: A Mesh CPU structure is characterized by Routing channels that form highway and neighbor connections between PEs. In the MChain architecture, no such structure exists.

GPU: GPU structures are characterized by multiple parallel Threads comprised of multiple PEs. These threads can be very lengthy. In the MChain, no threads are formed, each MChain has only a single PE.

Multi-core CPU: Multi-core CPU structures are characterized by a Local cache, often referred to as L1 and L2. In the MChain, no such cache exists. Note, an accumulator is present inside the MChain on the output side of each PE.

Vector Processing: Vector processing structures are characterized by Vector operation and Shared Instruction, In the MChain structure, no such vector is present, rather the input data is represented in matrices (and tensors). Also, there is no shared instruction set, all MChains perform dot-product calculations in both CNN and MM computations without instruction code.

TPU: TPU structures are characterized by two elements: Tensor Processing Unit (TPU) and/or Tensor Core, TPUs use Systolic Array structures inside, and therefore rely on a 2-D structure, as described earlier, whereas the MBlock does not. A typical Tensor Core is defined as a 3-input matrix operation: D=A×B+C, in which A, B, C and D are matrices. The MChain computes a dot product of d=a–b, all being matrices. There is no c input matrix. In one embodiment, and the a and b dimensions are fixed at 3×3, regardless of the actual A and B dimensions.

Pipeline Processing: Pipeline processing is characterized by Buffering, Dependency, Order, and Transfer operations, The MChain/MBlock compute structure can best be seen as a 'wave pipeline', in which no buffering, no transfer, no dependency, and no (re)ordering takes place. All computations are pre-defined, synchronous and non-blocking.

General: CPU/GPU/TPU require instruction code to be executed in the PEs. The MChain does not have such a requirement.

High-Speed Register to MChain

Figure 13:
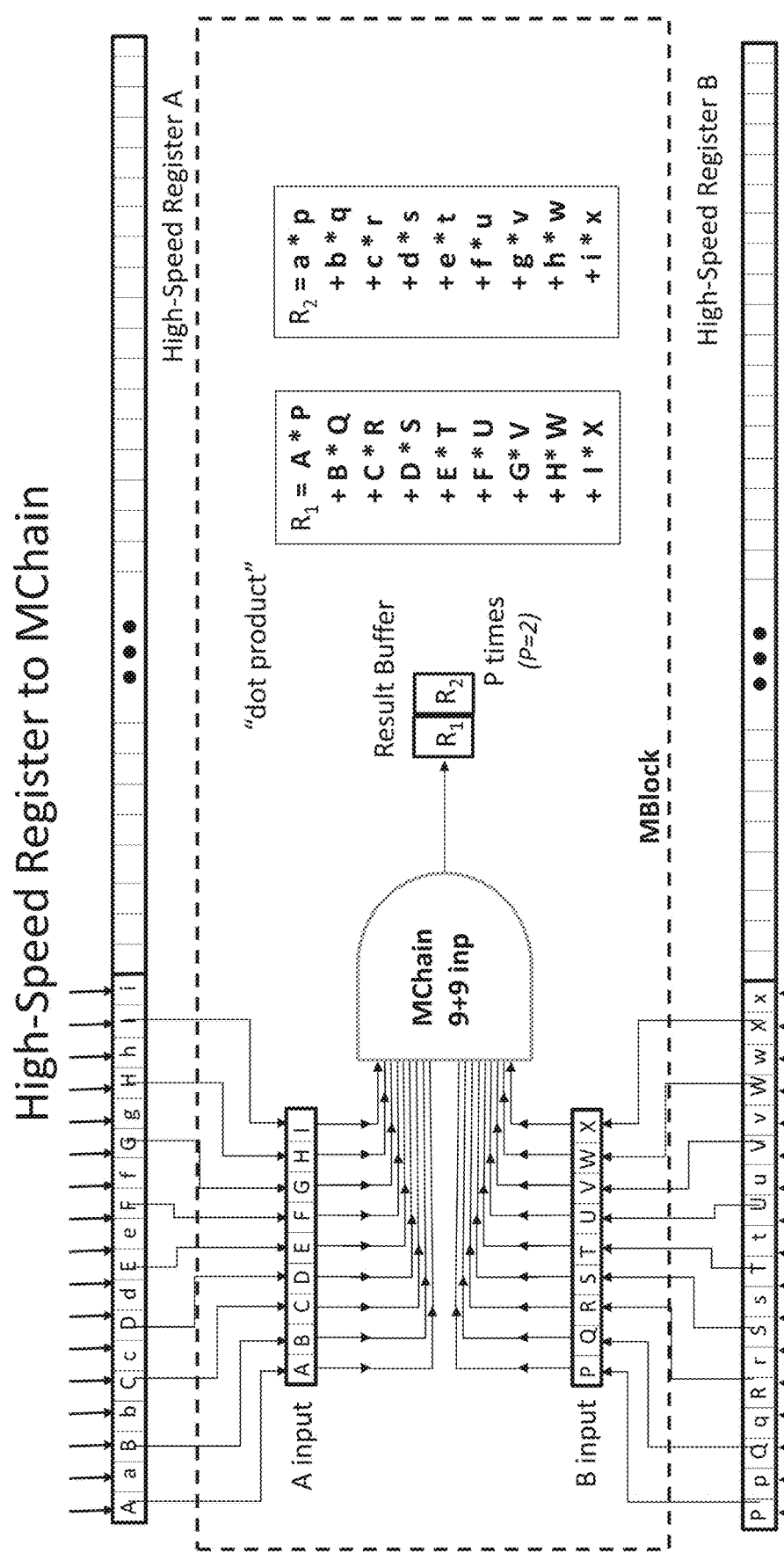
FIG. 13 shows the connection from the High-Speed Register(s) to the first MChain in the MBlock, according to an embodiment.

FIG. 13 shows how the dot-products are calculated. In this embodiment, the MChain is configured to compute the 3×3 kernels (9 terms) at once using 9 input pairs, at the A and B side. We showed in FIG. 11 how Input Register A 404 connects to the High Speed-Register A 311. The path from Input Register B 405 to the High-Speed-Register B 310 may be done similarly.

We show two 9 term input vectors: A input and B input. Because we use clock ratio P=2, the MChain will compute twice per clock cycle, and this is achieved by the Input signals being connected to the High-Speed Register, which makes a single shift to move the data from A to a, and P to p, and so on. This way, the R1 result is the dot product of the two kernels {A thru I} and {P thru X} and the R2 result is the dot product of the two kernels {a thru i} and {p thru x}.

Because the MChain produces two data values each clock cycle, more logic follows the MChain to handle this (shown in FIG. 12).

Slice to MChain

Figure 14:
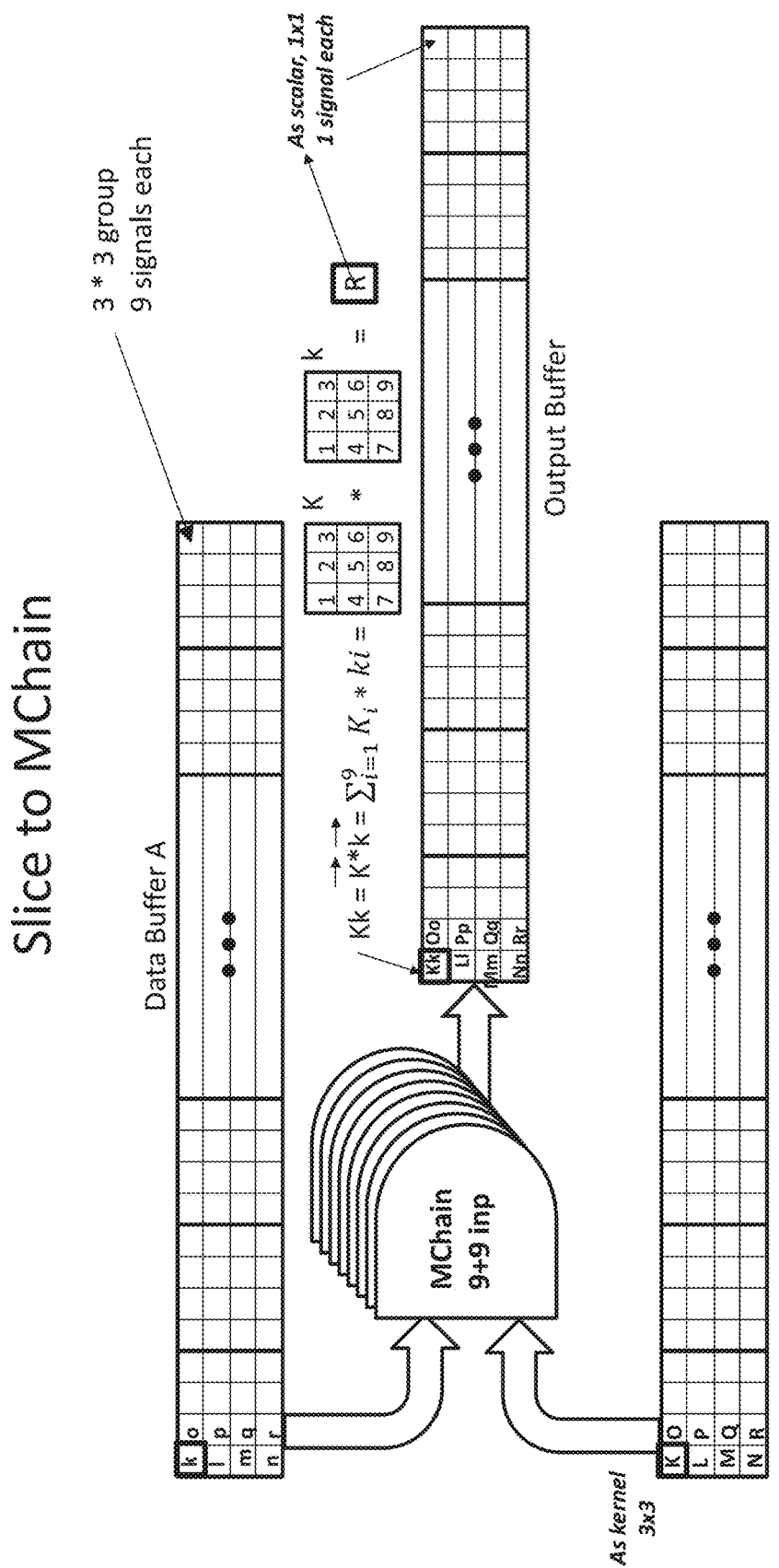
FIG. 14 shows conceptually how data from both Input Register A 309 and Input Register B 310 are accumulated in the Output Buffer, according to an embodiment.

FIG. 14 shows the Slice to the MChain from a higher-level perspective. FIG. 14 shows that each 3×3 data on the Data Buffer A side can be matched with the corresponding 3×3 kernel on the Data Buffer B side and its dot-product can be calculated and extracted. For a 3×3 kernel, with padding=1, 9 shifts are used to compute the entire 3×3 output. That is, in a first cycle, we would compute the value for Kk1, by aligning the proper signals. By applying a shift to the Data Buffer A, through is shifting slice in the path, we can then generate the data for Kk2, as explained in the discussion for FIG. 5.

For kernels that are binned to the 6×6 Kernel, the total number of shifts increases to 36. For kernels that are binned to the 12×12 Kernel, the total number of shifts increases to 144.

In one embodiment, the shifting slice is put at Input Buffer A. The shifting slice may also be put at Input Buffer B. We now have described a method to produce the results after convolution for the entire Input Register A. The kernels are being computed in parallel, and the shifting sequence depth is related to the actual kernel that was binned to.

Data arrangement and data flow can be addressed separately. The output buffer follows a pre-determined pattern for each layer.

Input Depth Din (channels) and # Kernel filters Dout

In one embodiment, the AI processor supports 2D and 3D convolutions. The architecture can handle all three operations, such as K=2 or K=3, i.e., a 3×3 kernel. The architecture can also be used for a fully connected model. Alternatively, or additionally, additional hardware may be added for processing data in the fully connected layers. The AI processor can handle various types of convolutions efficiently, given the methods described above.

Matrix Multiplication

Figure 15:
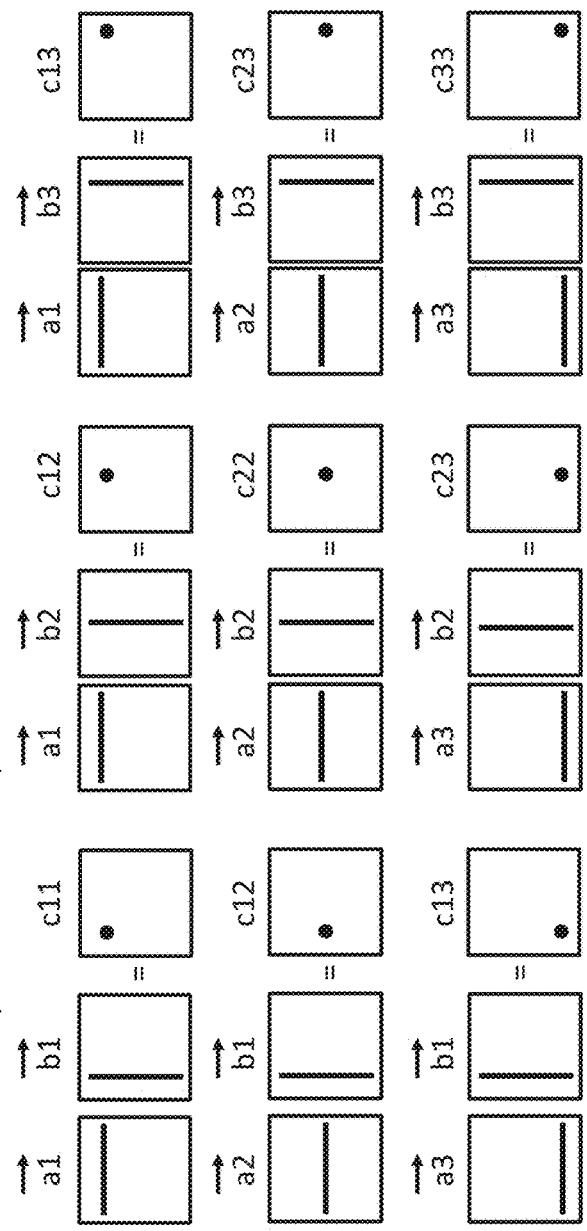
FIG. 15 is an illustration of how matrix multiplication takes place, according to an embodiment.

FIG. 15 shows a typical Matrix Multiplication example, in this case for a 3×3 arrangement. In ANN, operations for the K=1, 1×1 kernel, as well as data in the fully connected layer often involve matrix multiplication. This is different than convolution, yet the AI processor can perform the matrix multiplication using the same hardware arrangement.

In FIG. 15, matrix multiplication can be expressed as a series of dot product computations. By aligning the data in Input Buffer A in rows, and the data (network weights) in columns in Data Buffer B, we satisfy the input condition as shown in this figure: For two 3×3 matrices, there are 3 rows and 3 columns, and the output has 9 values, each the dot products of its row/column combination.

Matrix Multiplication-2

Figure 16:
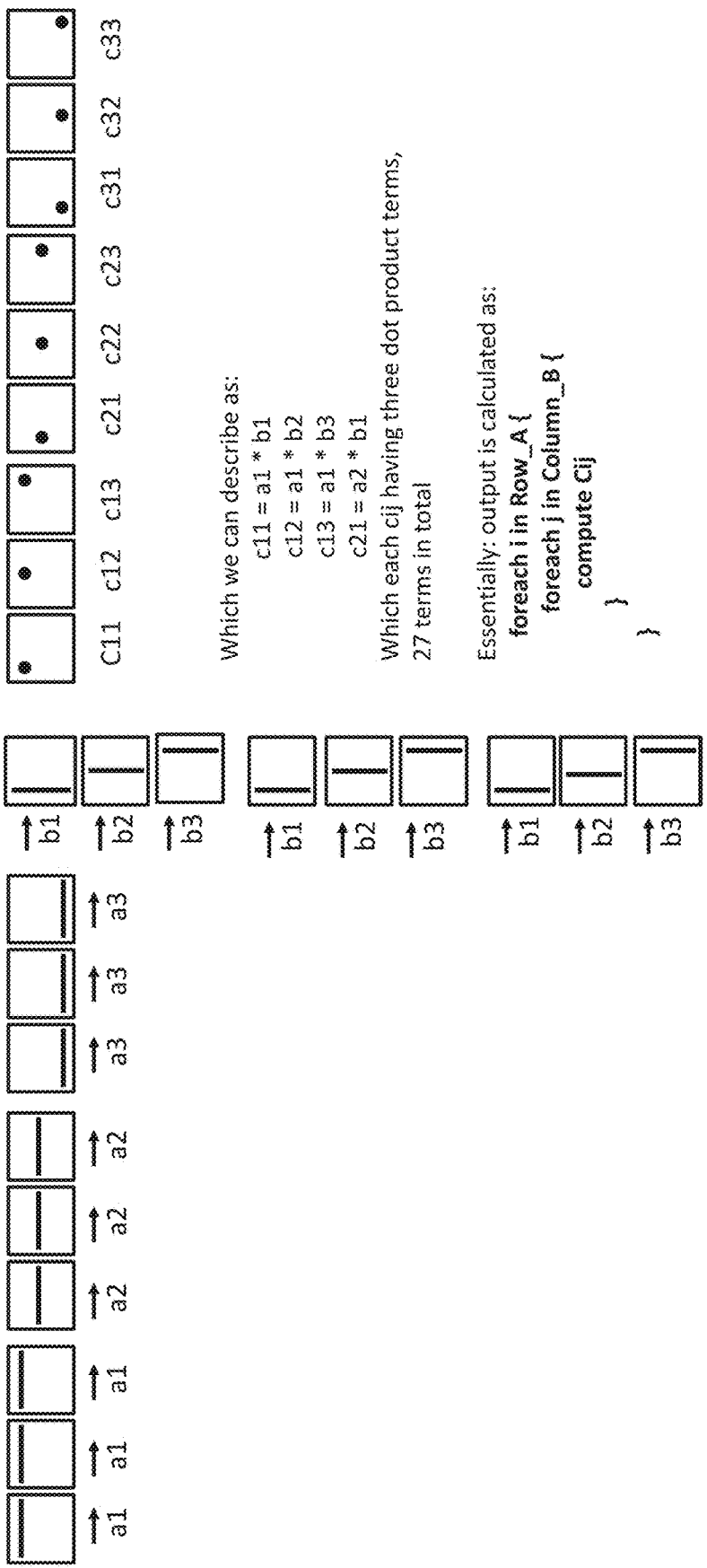
FIG. 16 shows the same matrix multiplication, but rearranged by rows and columns, according to an embodiment.

FIG. 16 shows the same outputs as FIG. 15, but rearranged in a continuous row and a continuous column. The input data matrix is unrolled by rows in Data Buffer A and the input weight matrix is unrolled by column in Data Buffer B. It should be obvious that the position of the rows, such as a1, a2, a3, in Data Buffer A does not matter, as long as it correlates to the corresponding location in Data Buffer B, such as b1, b2, b3.

We draw attention back to FIG. 11—in this mapping we are doing the same alignment of data sets as we did for convolution. E.g., the a1, a2, a3 rows form the data for the first data set {A, B, C, D, E, F, G, H I} whereas the b1, b2, b3 columns form the data for the second data set {a, b, c, d, e, f, g, h, i}. The resulting output value C that is computed using the MChain is the dot product of these first 9 terms.

Matrix Multiplication-3

FIG. 17 shows a matrix multiplication in a more generalized manner. Each row is broken up in segments of 9 terms, and this is linearly laid out in the input buffers A and B, by row and by column, respectively. On the output side, the output produces the dot products for such 9A+9B sections. These may be referred to as sub-terms. A full term is produced when the entire row or column has been processed, and the results for all the sub-terms has to be added.

Using the same 3×3 kernel technique, the matrix multiplication results are computed using the same physical arrangement designed for the convolution.

We refer back to FIG. 9. We discussed the summation tree at the left for CNN 901. It should be obvious to anyone skilled in the art that such summation tree can also be utilized for other purposes, such as back propagation, activation, etc.

We now briefly discuss the summation tree for matrix multiplication MM 902. If no additional hardware is added, the summation tree that exists will product results for input matrices that are formed as 9×9, 18×18, 36×36, 72×72 {9, 18, 36, 72}. As this is coarser than desired cases in some situations, additional switches may be added to change this to for example {9, 18, 27, 36, 45, 54, 63, 81, 90, 108, 126, 180, 216, 360} and so on.

These values become the boundaries at which the AI processor will bin the matrices. The logic to add to this is added to the MBlock, in the Local Logic section in FIG. 12. One can easily see that this results in mostly local logic.

One caveat to mention here is that the Data Buffer B (weights) can become very large, and much larger than we would like to dimension. If this occurs, Data Buffer B can be made into a streaming buffer from the Memory, and the computation of the matrix multiplication will then be performed at memory load speeds for the slice data, which requires more than a single clock cycle, so the network execution will slow down. The effect of slowdown is complex, but less severe than one would anticipate. E.g., the 102M parameter set (weights) in the Fully Connected layer only affects the network speed by 26%.

Summary

The architectures in various embodiments allow for both convolution and matrix multiplication of arbitrarily large sizes. In one embodiment, the Data Buffers and other elements that need to be configured in FIG. 3 are dimensioned such that an optimum is found between silicon area, power, speed, and capacity. We can dimension such architecture to handle all known ImageNet networks, and also new variants, such as BERT-base and BERT-large.

It should be clear that the manipulation of the data (slices) for both convolution and matrix multiplication is predetermined and can be derived from the network configuration. Each layer has its own set of manipulations, and even the layer-to-layer data location is all pre-computed and is known during execution. As a result, this architecture operates without an instruction set. This approach produces valid results without any instructions for the processing elements (no fetch, compute, load). The architecture is heavily pipelined, yet such pipelining has little to no effect on overall performance, as the network execution time is significantly longer than the pipeline delays per layer, accumulated over all layers.

The real-world performance of said architecture is able to achieve higher performance, lower price, and lower power when compared to similar products in the market today.

Upon reading this disclosure, those of skill in the art will appreciate still additional alternative designs for processing nodes. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An artificial intelligence accelerator for performing computations related to a neural network, the artificial intelligence accelerator comprising:
    an input register configured to operate at a first clock speed and store an input dataset of a layer in the neural network, wherein the input dataset has multiple dimensions and is divisible into a plurality of kernels, the plurality of kernels comprising a first kernel and a second kernel;
    a high-speed register in communication with the input register, the high-speed register configured to operate at a second clock speed that is faster than the first clock speed, the high-speed register comprising a linear array, which is configured to store values of at least the first kernel and the second kernel in an interleaved manner; and
    a multiplication block circuit in communication with the high-speed register, the multiplication block circuit configured to perform the computations related to neural network, wherein the high-speed register is configured to shift the values stored in the high-speed register in a sub-cycle according to the second clock speed so that the first kernel and the second kernel are computed by the multiplication block circuit in a single clock cycle that is measured according to the first clock.

2. The artificial intelligence accelerator of claim 1, wherein the second clock speed is faster than the first clock speed N times and the linear array is configured to store values of N kernel in the interleaved manner.

3. The artificial intelligence accelerator of claim 1, wherein the plurality of kernels include data that represent multi-dimensional data and the linear array is configured to the multi-dimensional data in a flattened manner.

4. The artificial intelligence accelerator of claim 1, wherein the input register is a first input register and the high-speed register is a first high-speed register, and wherein the artificial intelligence accelerator further comprises a second input register and a second high-speed register.

5. The artificial intelligence accelerator of claim 4, wherein the first input register is configured to store the input dataset of the neural network and the second input register is configured to weight data of the neural network.

6. The artificial intelligence accelerator of claim 1, wherein the computations include one of convolutions, matrix multiplications, or dot products or any combination thereof.

7. The artificial intelligence accelerator of claim 1, wherein the multiplication block circuit is configured to receive no instruction set in performing the computations.

8. The artificial intelligence accelerator of claim 1, wherein the multiplication block circuit is configurable.

9. The artificial intelligence accelerator of claim 8, wherein configurations of the multiplication block circuit are different among layers in the neural network.

10. The artificial intelligence accelerator of claim 1, wherein at least one of the kernels in the plurality of kernels has a predetermined kernel size that is a square matrix.

11. The artificial intelligence accelerator of claim 1, wherein the multiplication block circuit is pipelined.

12. The artificial intelligence accelerator of claim 1, wherein the multiplication block circuit comprises a summation tree.

13. The artificial intelligence accelerator of claim 12, wherein the summation tree represents a kernel layout of an input shift register connected to the multiplication block circuit.

14. The artificial intelligence accelerator of claim 1, the multiplication block circuit comprises multiple identical subunits that are configured to perform the computations in parallel.

15. A computing device, comprising:
    a memory configured to store a neural network; and
    a system-on-a-chip (SoC) processor, the SoC processor comprises a central processing unit and an artificial intelligence accelerator, the central processing unit configured to operate at a first clock speed, wherein the artificial intelligence accelerator comprises:
        a high-speed register configured to operate at a second clock speed that is faster than the first clock speed, the high-speed register being a linear array, which is configured to store values of two or more kernels of the neural network in an interleaved manner; and
        a multiplication block circuit in communication with the high-speed register, the multiplication block circuit configured to perform the computations related to neural network, wherein the high-speed register is configured to shift the values stored in the high-speed register in a sub-cycle according to the second clock speed so that the two or more kernels are computed by the multiplication block circuit in a single clock cycle that is measured according to the first clock.

16. The computing device of claim 15, wherein the second clock speed is faster than the first clock speed N times and the linear array is configured to store values of N kernel in the interleaved manner.

17. The computing device of claim 15, wherein the two or more kernels include data that represent multi-dimensional data and the linear array is configured to the multi-dimensional data in a flattened manner.

18. The computing device of claim 15, wherein the multiplication block circuit is configured to receive no instruction set in performing the computations.

19. A method for operating an artificial intelligence accelerator for performing computations related to a neural network, the method comprising:
    operating an input register at a first clock speed;
    storing, at the input register, an input dataset of a layer in the neural network, wherein the input dataset has multiple dimensions and is divisible into a plurality of kernels, the plurality of kernels comprising a first kernel and a second kernel;

operating a high-speed register at a second clock speed that is faster than the first clock speed, the high-speed register in communication with the input register;

storing, at a linear array of the high-speed register, values of at least the first kernel and the second kernel in an interleaved manner;

shifting the values stored in the high-speed register in a sub-cycle according to the second clock speed to a multiplication block circuit that is in communication with the high-speed register; and performing the computations related to neural network according to the second clock speed so that the first kernel and the second kernel are computed by the multiplication block circuit in a single clock cycle that is measured according to the first clock.

20. The method of claim 19, wherein the computations include one of convolutions, matrix multiplications, or dot products or any combination thereof.

* * * * *